(12) United States Patent
Acosta et al.

(10) Patent No.: US 7,502,026 B2
(45) Date of Patent: Mar. 10, 2009

(54) SYSTEM AND METHOD FOR ANALYZING AND IMAGING THREE-DIMENSIONAL VOLUME DATA SETS

(75) Inventors: Mark Acosta, Houston, TX (US); Yin Cheung, Sugar Land, TX (US); Jack Lees, Houston, TX (US); Charles Sembroski, Katy, TX (US); Michael Zeitlin, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 48 days.

(21) Appl. No.: 11/485,104

(22) Filed: Jul. 12, 2006

(65) Prior Publication Data

US 2007/0195087 A1 Aug. 23, 2007

Related U.S. Application Data

(63) Continuation of application No. 11/056,823, filed on Feb. 12, 2005, now Pat. No. 7,098,908, which is a continuation of application No. 09/936,682, filed on Sep. 17, 2001, now Pat. No. 7,006,085, which is a continuation of application No. PCT/US00/29835, filed on Oct. 30, 2000.

(51) Int. Cl.
*G06T 17/00* (2006.01)
(52) U.S. Cl. ................ 345/424; 345/419; 345/421; 345/441; 345/442
(58) Field of Classification Search ................ 345/419, 345/420, 424, 421, 441, 442
See application file for complete search history.

(56) References Cited

U.S. PATENT DOCUMENTS 4,359,766 A 11/1982 Waters et al.

(Continued)

FOREIGN PATENT DOCUMENTS

WO WO/96/18915 6/1996

(Continued)

OTHER PUBLICATIONS

"CogniSeis Turns Up the Volume with the Latest Release of VoxelGeo", Press Release, Printed Mar. 27, 1998,(Apr. 30, 1997), 2 pages.

(Continued)

*Primary Examiner*—Kimbinh T Nguyen
(74) *Attorney, Agent, or Firm*—Crain, Caton & James

(57) ABSTRACT

A system and method is provided for analyzing and imaging three-dimensional volume data sets. In one embodiment of the invention, a ribbon section is produced which may include a plurality of planes projected from a polyline. The polyline may include one or more line segments preferably formed within a plane. The projected planes intersect the three-dimensional volume data set and the data located at the intersection may be selectively viewed. The polyline may be edited or varied by editing or varying the control points which define the polyline. In another embodiment of the present invention, a method is provided for quickly tracking a physical phenomena represented within the three-dimensional volume data set. A plurality of planes may be successively displayed in the three-dimensional volume data set from which points are digitized related to the structure of interest to create a spline curve on each plane. The area between the spline curves is interpolated to produce a surface representative of the structure of interest, which may for example be a fault plane described by the three-dimensional volume data set. In this manner, the user can more easily and effectively visualize and interpret the features and physical parameters that are inherent in the three-dimensional volume data set.

22 Claims, 17 Drawing Sheets

U.S. PATENT DOCUMENTS

| | | | |
|---|---|---|---|
| 4,467,461 | A | 8/1984 | Rice et al. |
| 4,751,643 | A | 6/1988 | Lorensen et al. |
| 4,984,157 | A | 1/1991 | Cline et al. |
| 5,056,066 | A | 10/1991 | Howard |
| 5,148,494 | A | 9/1992 | Keskes |
| 5,313,567 | A | 5/1994 | Civanlar et al. |
| 5,410,250 | A | 4/1995 | Brown |
| 5,432,751 | A | 7/1995 | Hildebrand |
| 5,455,896 | A | 10/1995 | Takamura |
| 5,537,320 | A | 7/1996 | Simpson et al. |
| 5,563,949 | A | 10/1996 | Bahorich et al. |
| 5,574,836 | A | 11/1996 | Broemmelsiek |
| 5,586,082 | A | 12/1996 | Anderson et al. |
| 5,659,691 | A | 8/1997 | Durward et al. |
| 5,722,408 | A | 3/1998 | Dehner et al. |
| 5,734,384 | A | 3/1998 | Yanof et al. |
| 5,759,044 | A | 6/1998 | Redmond |
| 5,781,194 | A | 7/1998 | Ponomarev et al. |
| 5,798,982 | A | 8/1998 | He et al. |
| 5,838,564 | A | 11/1998 | Bahorich et al. |
| 5,852,447 | A | 12/1998 | Hosoya et al. |
| 5,892,732 | A | 4/1999 | Gersztenkom |
| 5,930,730 | A | 7/1999 | Marfurt et al. |
| 5,949,424 | A | 9/1999 | Cabral et al. |
| 5,966,672 | A | 10/1999 | Knupp |
| 6,049,759 | A | 4/2000 | Etgen |
| 6,078,869 | A | 6/2000 | Gunasekera |
| 6,083,162 | A | 7/2000 | Vining |
| 6,144,383 | A | 11/2000 | Lichtenbelt et al. |
| 6,396,495 | B1 | 5/2002 | Parghi et al. |
| 6,473,696 | B1 | 10/2002 | Onyia et al. |
| 6,594,585 | B1 | 7/2003 | Gersztenkom |
| RE38,229 | E | 8/2003 | Murfurt et al. |
| 6,765,570 | B1 | 7/2004 | Cheung et al. |

FOREIGN PATENT DOCUMENTS

| | | |
|---|---|---|
| WO | WO/00/14574 | 3/2000 |
| WO | WO 02/29445 | 4/2002 |

OTHER PUBLICATIONS

"Does Your 3D Interpretation Software Move As Fast As You Do?", Brochure published by Magic Earth, 2 pages.

"GeoQuest at a Glance", Printed May 3, 1998, 3 pages.

"GeoQuest Enhances GeoViz and Voxels for Octane", Printed May 3, 1998,(1997), 3 pages.

"IESX Intergrated Multisurvey Interpretation Software Product Description", GeoQuest, Printed May 3, 1998,(Feb. 23, 1996), 17 pages.

"Texaco Announces the Opening of New 3-D Visualization Center in Houston, Business Wire", (Nov. 11, 1997), 1pg.

"Texaco E&P Center Allows Visual Probe of 3D Data Volumes", Oil & Gas Journal, (Jun. 1, 1998), pp. 46-47.

"VoxelGeo Consortium Meeting Summary," CogniSets Develoopment, Jun. 13, 1996, 2 pgs.

"VoxelGeo Product Description, Paradigm Geophysical Broadband Solutions in Depth, "VoxelGeo"", CogniSeis website www.cogniseis.com/voxelgeo.html, (1996), 5 pages.

Achenbach, S., "Curved Multiplanar Reconstructions for the Evaluation of Contrast-Enhanced Electron Beam CT of the Coronary Arteries", *American Journal of Roentgenology*, Baltimore, MD, vol. 170, No. 4, Apr. 1998, pp. 895-899.

Antosh, Nelson, "Oil Now Showing at a Theater Near You", Houston Chronicle, (Sep. 19, 1997), 2 pages.

Compton, Mark, "A Dream Comes True", IRIS Universe #26, (Jun. 1997), 3 pages.

Gatti, C., "An Interactive System for Volume Analysis", Scientific Visualization Advanced Software Techniques, (1993),Section 3.2.

Goldman, Jon, "The Cosmic Worm", IEEE Computer Graphics and Applications, (Jul. 1994), pp. 12-14.

Gras, Rutger, "Automated 3-D Software Interprets Fault Systems", World Oil, (May 1998), pp. 81-83.

Hutchinson, Suzi, "FZAP! 1.0 Offers Automated Fault Picking", www.lgc.com/UserNet/mj97/mj97 4.html, Printed Mar. 27, 1998,(May/Jun. 1997), 5 pages.

Kilgard, Mark J., "A Practical and Robust Bump-Mapping Technique for Today's GPUs", NVIDIA Corporation, Santa Clara, CA, Jul. 5, 2000, pp. 1-39.

Koen, A.D., "Tough Economics Remold Production R&D Campaign", Oil & Gas Journal, (Jul. 5, 1993), pp. 14-18.

Lees, Jack, "Constructing Faults from Seed Picks by Voxel Tracking", The Leading Edge, Mar. 1999, pp. 338, 340.

Ochi, T. "Curved planar reformatted CT angiography: usefulness for the evaluation of aneurysms at the carotid siphon", *American Journal of Neuroradiology*, American Society of Neuroradiology, vol. 20, No. 6, Jun. 1999, pp. 1025-1030.

Parker, David, "Systems Aspects of Visualization Applications", System Architecture, Chapter 8, CRC Press, Inc., Chapter 8, CRC Press, Inc.,(1995), pp. 241-265.

Peloso, Andy, "Open Vision 4.0", UserNet, printed Mar. 27, 1998,(May/Jun. 1997),8 pages.

Pepke, Eric, "Animation and the Examination of Behavior Over Time", Computer Visualization Graphics Techniques for Scientific and Engineering Analysis, (1995), pp. 203-238.

Petzet, G. A., "Interactive 3D Visualization Speeds Well, Reservoir Planning", Oil and Gas Journal, (Nov. 24, 1997), pp. 82-83.

Scheier, Robert L., "Creating a Cash Gusher", Computerworld, (Apr. 21, 1997),pp. 76-78.

Shamban, Adam, "Earth Cube 1.2: New Functinality and Work Flows", UserNet, Printed Mar. 27, 1998,(May/Jun. 1997),10 Pages.

Thomas, Kate, "Oil Buz Gushes Patents", The National Law Journal, (Feb. 6, 1998), pp. 1,26.

Wang, Sidney W., "Volume Sculpting", Paper presented at 1995 Symposium on Interactive 3D Graphics, Monterey, CA, U.S.A., (1995), pp. 151-156, 214.

Zeitlin, Michael, "3-D Seismic Visualization", 1 page presentation given at the Emerging Technologies Group Diner Meeting, printed from www.hougeo.org/meet0398.htm (Mar. 12, 1998).

Zeitlin, Michael, "Integration Strategy Takes Full Advantage of 3-D Seismic Capability", World Oil, (May 1995), pp. 59-60.

Zeitlin, Michael, "Visualization Brings a New Dimension to Oil Exploration and Production", GEOBYTE, (Jun. 1992), pp. 36-39.

Landmark Graphics Corporation, Operational manual on "Seiscube," Oct. 1996, pp. 1-272.

Landmark Graphics Corporation, Operational manual on "OpenVision," Jul. 1997, pp. 1-169.

Cogniseis, "VoxelGeo version 2.2 Product Definition version 14", May 1996, 27 pages, Houston, Texas.

VoxelGeo User's Manual Release 2.1.5, Oct. 1996, 213 pages, Cogniseis Development, Inc., Houston, Texas.

Tanner, M. Turhan, Ernest E. and Neidell, Norman S.; Paleo Seismic and Color Acoustic Impedence Sections; Applications of Downward Continuation in Structural and Stratigraphic Context; 1982; pp. 110-111; Expanded Abstract S8.7, 52nd Annual Meeting of The Society of Exploration Geophysicists; Dallas, Texas.

Levin, Stewart A.; Resolution in Seismic Imaging: Is it all a Matter of Perspective?; Geophysics 63(2); Mar.-Apr. 1998; pp. 743-749; vol. 63, No. 2; USA.

Yilmaz, Oz, and Lucas, Darran; Prestack Layer Replacement; Geophysics 51(7); Jul. 1986; pp. 1355-1369; vol. 51, No. 7; USA.

"VoxelGeo Consortium Meeting Summary," CogniSeis Development, Jun. 13, 1996, 2 pages.

Ching-Rong Lin, R. Bowen Loftin, and H. Roice Nelson, Jr., Interaction with Geoscience Data in an Immersive Environment, Virtual Reality, 2000, pp. 55-62.

Ching-Rong Lin and R. Bowen Loftin, Application of Virtual Reality in the Interpretation of Geoscience Data, Proceedings of the ACM Symposium on Virtual Reality Software and Technology, 1998, pp. 187-194.

VoxelGeo, Paradigm Geophysical Broadband Solutions in Depth, Mar. 27, 1998, 5 pages, printed from CogniSeis website www.cogniseis.com/voxelgeo.htm.

Holden, Paul, VoxelGeo 1.1.1: Productivity Tool for the Geosciences, Release Notes (1994) & User's Guide (Rev. Mar. 1994), Vital Images, Inc., pp. 1-461.

Brown, Alistair R., "Interpretation of Three-Dimensional Seismic Data", AAPG Memoir 42; Dec. 1999, pp. 19, 233, 5th Edition; American Association of Petroleum Geologists.

Cai, Wenli and Sakas, Georgios, Data Intermixing and Multi-Volume Rendering; Eurographics '99; 1999; pp. 359-368; vol. 18, No. 3; Blackwell Publishers, Oxford, UK and Malden, MA.

Neider, Jackie, Davis, Tom, and Woo, Mason; OpenGL Programming Guide; 1994; pp. 422-427; 3rd Edition; Multitexturing; Silicon Graphics, Inc.; Addison-Wesley Professional.

James D. Foley et al, Computer Graphics: Principles and Practice (2nd ed.), 1990, p. 838, Boston, Massachusetts, USA.

Lin, Ching-Rong, Loftin, R. Bowen & Stark, Tracy: Virtual Reality for Geosciences Visualization: Computer Human Interaction; 1998; Proceedings, 3rd Asia Pacific Shonan Village Center; Japan; Jul. 15-17, 1998; pp. 196-201; IEEE Comput. Soc. US, Las Alamitos, CA.

IRIS Universe No. 36, Silicon Graphics Inc., Summer 1996, p. 96.

"Computing", Mechanical Engineering Magazine, Oct. 1996, 8 pages, The American Society of Mechanical Engineers.

Cortesi, "REACTTM Real Time Programmer's Guide", Mar. 18, 1997, 187 pages, Silicon Graphics Inc., California, U.S.A.

Bajaj, et al., "Fast Isocontouring for Improved Interactivity", Proc. ACM SIGGRAPH/IEEE Symposium on Volume Visualization (ACM Press, 1996), pp. 39-46.

Lacroute, "Fast Volume Rendering Using a Shear-Warp Factorization of the Viewing Transformation", Doctoral dissertation submitted to Departments of Electrical Engineering and Computer Science Stanford University, Sep. 1995, p. 237, Stanford University Stanford, CA, USA.

Cabral, et al., "Accelerated Volume Rendering and Tomographic Reconstruction Using Texture Mapping Hardware", 1995, p. 91-97, Association for Computing Machinery, New York, U.S.A.

Cullip Timothy and Neumann Ulrich, "Accelerating Volume Reconstruction with 3D Texture Hardware", 1993, 6 pages, University of North Carolina, Chapel Hill, U.S.A.

Cignoni, Montani, Scopigno, "MagicSphere: an insight tool for 3D data visualization," 1994, p. 317-328, vol. 13(3), Computer Graphics Forum, The Eurographics Association and Blackwell Publishing Ltd. Oxford, U.K.

Yagel Roni, "The Flipping Cube: A Device for Rotating 3D Rasters", "Advances in Computer Graphics Hardware (Machines)", 1991, p. 86-99.

Höllerer, Hege, Stallings, "Visualization and 3D-Interaction for Hyperthermia Treatment Planning," 1995, 7 pages, Proceedings, 9th International Symposium on Computer Assisted Radiology, CH Volume Visualization Workshop, Berlin, Germany.

Levoy Marc, "Design for a Real-Time High-Quality Volume Rendering Workstation", Proceedings of the Chapel Hill Workshop on Volume Visualization, 1989, p. 85-92, Association for Computing Machinery, New York, U.S.A.

Kanus, et al, "Implimentations of Cube-4 on the Teramac Custom Computing Machine", "Computers And Graphics", 1997, p. 199-208, vol. 21, Elsevier, London, U.K.

Kaufman, Bakalash "Memory and Processing Architecture for 3D Voxel-Based Imagery," "IEEE Computer Graphics and Applications", Nov.-Dec. 1988, pp. 10-23, vol. 08 No. 6, IEEE Computer Society, Washington D.C., U.S.A.

Brady, et al, "Crumbs: a virtual environment tracking tool for biological imaging," IEEE Symposium on Frontiers in Biomedical Visualization, 1995, p. 18, IEEE Computer Society, Washington DC, U.S.A.

Fraser Robert, "Interactive Volume Rendering Using Advanced Gaphics Architectures," 1994, 8 pages, Silicon Graphics Inc.

Kulic, "Building an OpenGL Volume Renderer" "SGI Development News", 1996, 9 pages.

Serra, et al., "Interactive Vessel Tracing in Volume Data", 1997, pp. 131-137, "Symposium on 3D Grapics", Providence, RI.

Pfister, Kaufman, "Cube 4—A Scalable Architecture for Real-Time Volume Rendering," Proceedings 1996 IEEE Symposium on Volume Visualization, Oct. 28-29, 1996, pp. 47-54, 100.

Speray, Kennon, "Volume Probes: Interactive data Exploration on Arbitrary Grids" Computer Graphics, vol. 24 issue 5, Nov. 1990, pp. 5-12, Association for Computing Machinery, New York, U.S.A.

Lorensen, Cline, "Marching Cubes: A High Resolution 3D Surface Construction Algorithm," Computer Graphics, vol. 21 issue 4, Jul. 1987, pp. 163-169, Association for Computing Machinery, New York, U.S.A.

Durkin, Hughes, "Nonpolygonal Isosurface Rendering for Large Volume Datasets", "Proceedings of the conference on Visualization '94", 1994, p. 293-300, IEEE Computer Society Press, Los Alamitos, CA, U.S.A.

Ney, Fishman, "Editing Tools for 3D Medical Imaging," IEEE Computer Graphics & Applications, Nov. 1991, pp. 63-71, vol. 11 issue 6, IEEE Computer Society Press, Los Alamitos, CA, U.S.A.

SYSTEM AND METHOD FOR ANALYZING AND IMAGING THREE-DIMENSIONAL VOLUME DATA SETS

CROSS-REFERENCE TO RELATED APPLICATIONS

This application is a continuation of U.S. application Ser. No. 11/056,823 filed Feb. 12, 2005, now U.S. Pat. No. 7,098,908, application Ser. No. 09/936,682 filed Sep. 17, 2001 which is a continuation of U.S. Pat. No. 7,006,085, both of which claim the benefit of PCT/US2000/29835 filed on Oct. 30, 2000, and are incorporated herein by reference.

STATEMENT REGARDING FEDERALLY SPONSORED RESEARCH

Not applicable.

FIELD OF THE INVENTION

The present invention relates generally to imaging of three-dimensional ("3D") volume data sets. More particularly, the present invention relates to fast visualization and analysis of structures within 3D volume data sets.

BACKGROUND OF THE INVENTION

Many fields of endeavor require the analysis and imaging of three-dimensional ("3D") volume data sets. For example, in the medical field, a CAT (computerized axial tomography) scanner or a magnetic resonance imaging (MRI) device is used to produce a "picture" or diagnostic image of some part of a patient's body. The scanner or MRI device generates a 3D volume data set that needs to be imaged or displayed so that medical personnel can analyze the image and form a diagnosis.

Three-dimensional volume data sets are also used in various fields of endeavor relating to the earth sciences. Seismic sounding is one method for exploring the subsurface geology of the earth. An underground explosion or earthquake excites seismic waves, similar to low frequency sound waves, that travel below the surface of earth and are detected by seismographs. The seismographs record the time of arrival of the seismic waves, both direct and reflected waves. Knowing the time and place of the explosion or earthquake, the time of travel of the waves through the interior can be calculated and used to measure the velocity of the waves in the interior. A similar technique can be used for offshore oil and gas exploration. In offshore exploration, a ship tows a sound source and underwater hydrophones. Low frequency (e.g., 50 Hz) sound waves are generated by, for example, a pneumatic device that works like a balloon burst. The sounds bounce off rock layers below the sea floor and are picked up by the hydrophones. In this manner, subsurface sedimentary structures that trap oil, such as faults, folds, and domes, are "mapped" by the reflected waves. The data is processed to produce 3D volume data sets that include a reflection or seismic amplitude data-value at specified (x, y, z) locations within a geographic space.

A 3D volume data set is made up of "voxels" or volume elements. Each voxel has a numeric value for some measured or calculated property, e.g., seismic amplitude of the volume at that location. One conventional approach to generating an image of a 3D volume data set is to cross-section the 3D volume data set into a plurality of two-dimensional ("2D") cross-sections or slices. The image of the 3D volume data set is then built as a composite of the 2D slices. For example, the image of the 3D volume data set is generated by stacking the 2D slices in order, back-to-front, and then composited into a complete image. The user sees the image being built layer by layer as the composite grows. Although the user can see the internal organization or structure of the volume as the composite image grows, the traditional slice and composite technique is typically slow, particularly when very large 3D volume data sets are being used. Additionally, the slice and composite technique clutters the user's field of view with extraneous information, and interferes with the user's ability to accurately visualize and interpret features inherent in the 3D volume data set.

Computer software has been developed specifically for imaging 3D seismic data sets for the oil and gas industry. Examples of such conventional computer programs include VoxelGeo, available from Paradigm Geophysical, Houston, Tex., SeisWorks and EarthCube, available from Landmark Graphics Corporation, and IESX, available from GeoQuest. Such conventional computer programs have numerous deficiencies that preclude a user from quickly and accurately visualizing and interpreting features inherent in a 3D seismic data set. Conventional computer programs for visualizing and interpreting 3D seismic data operate on the full 3D volume of seismic data. Consequently, every time a change is made, such as a change to the transparency or opacity settings, the full 3D volume of seismic data must be processed, and the image re-drawn. Even when such programs are run on highly efficient graphics supercomputers, the delay or lag in re-drawing the image is perceptible to the user. For a 3D volume containing 500 megabytes of seismic data, it can take on the order of 30-45 seconds for conventional programs to re-draw the complete image (frame rate of 0.03 to 0.02 frames per second, respectively). During the 30-45 second delay time, the mind of the user loses focus on the feature of interest, making it difficult to completely and properly analyze the seismic data.

Some conventional 3D seismic interpretation programs provide the capability to visualize and interpret a piece of the full 3D volume of seismic data. The user identifies the coordinates of the selected piece via a menu command. An image of the selected piece is drawn. The selected piece can then be rotated, if desired, at that location. However, to look at a different piece of the full 3D volume of seismic data, such as to follow a geologic feature that has been tentatively identified, the image must be interrupted, a new location or coordinates for the different piece is entered, and a new image is drawn containing the different piece. The interruption in the displayed image makes it difficult for the user to visualize any continuity between the two pieces of the full 3D volume of seismic data that have been imaged. This impedes the user's ability to interpret and identify the geologic features that are inherent in the full 3D volume of seismic data. Additionally, even though only a piece of the full 3D volume of seismic data is being visibly displayed, conventional 3D seismic interpretation programs continue processing the full 3D volume of seismic data to draw the image, thereby slowing the display of the image to the user.

Conventional 3D seismic interpretation programs provide the capability to "auto pick" and identify points that satisfy a voxel selection algorithm. However, these programs typically iterate through the full 3D volume of seismic data to identify the points that satisfy the voxel selection algorithm. This is time consuming even on a high speed graphics supercomputer. Additionally, conventional 3D seismic interpretation programs do not provide the capability to directly delete from the collection of picked voxels. The only way to "eliminate" points from the collection of picked voxels using conventional 3D seismic interpretation programs is to repeatedly adjust the selection criteria for the voxel selection algorithm until the points to be eliminated fall outside of the selection criteria for the displayed points that satisfy the voxel selection algorithm. Each time the selection criteria is adjusted, the image must be interrupted. This iterative process is time consuming, and interferes with the visualization process of the user.

Thus, there is a need in the art for a system and method for imaging 3D volume data sets that overcomes the deficiencies detailed above. Particularly, there is a need for a system and method that re-draws images of large 3D volume data sets in response to user input at a rate sufficiently fast that the user perceives an instantaneous or real-time change in the image, without perceptible delay or lag. There is a need for a system and method that allows a user to interactively change the displayed image in a continuous manner, without interruption or perceptible delay or lag. Such a system and method would allow a user to more quickly and accurately interpret and identify features inherent in 3D volume data sets.

SUMMARY OF THE INVENTION

The present invention Therefore, meets the above needs and overcomes one or more deficiencies in the prior art by providing systems and methods for imaging a thee-dimensional data volume, said three-dimensional data volume comprising a plurality of voxels, each voxel comprising a three-dimensional location and a dataword, said dataword being representative of a physical phenomena.

In one embodiment, the present invention includes a method for imaging a three-dimensional data volume, said three-dimensional data volume comprising a plurality of voxels, each voxel comprising a three-dimensional location and a dataword, said dataword being representative of a physical phenomena, which comprises i) creating at least one three-dimensional sampling probe, wherein said three-dimensional sampling probe is the same size or a subset of said three-dimensional data volume, said three-dimensional sampling probe having a probe face in a probe face plane and an opposing probe face in an opposing probe face plane; ii) producing a plurality of control points in said probe face plane, said plurality of control points defining one or more lines on said probe face plane; iii) extending a ribbon section from said probe face plane toward said opposing probe face plane, one edge of said ribbon section being formed by said one or more lines; and iv) selectively imaging datawords representative of said physical phenomena only at three-dimensional locations where said ribbon section intersects said thee-dimensional sampling probe.

In another embodiment, the present invention includes a computer program medium having computer executable instructions for imaging a three-dimensional data volume, said three-dimensional data volume comprising a plurality of voxels, each voxel comprising a thee-dimensional location and a dataword, said dataword being representative of a physical phenomena. The instructions are executable to implement i) displaying a plane within said three-dimensional data volume; ii) producing a plurality of control points in said plane, said plurality of control points defining one or more lines on said plane; iii) extending a ribbon section from said plane, one edge of said ribbon section being formed by said one or more lines; and iv) selectively imaging said datawords representative of said physical phenomena only at three-dimensional locations where said ribbon section intersects said thee-dimensional data volume.

Additional aspects, advantages and embodiments of the invention will become apparent to those skilled in the art from the following description of the various embodiments and related drawings.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Overview

Figure 1:
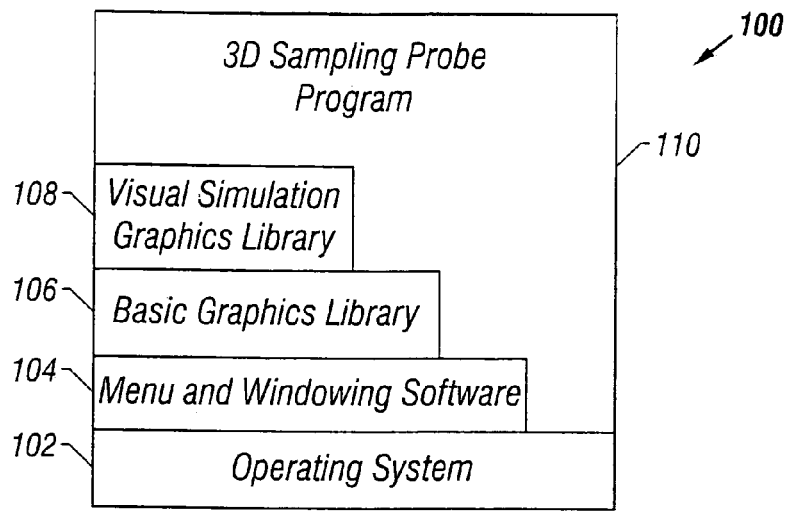
FIG. 1 shows one embodiment of a software or program structure for implementing the present invention.

The present invention is directed to a system and method for analyzing and imaging three-dimensional ("3D") volume data sets using a 3D sampling probe. 3D volume data sets comprise "voxels" or volume elements. Each voxel is a sample or point within a volume. Each voxel can be expressed in the form (x, y, z, datavalue) where "x, y, z" identifies the 3D location of the point within the volume, and "datavalue" is the value of some measured or calculated attribute or physical parameter at the specified point within the volume. For example, a 3D volume data set suitable for use with the present invention is 3D seismic data. Each voxel in a 3D seismic data can be expressed as (x, y, z, amplitude), with amplitude corresponding to the amplitude of reflected sound waves at the specified (x, y, z) location.

Any form of information that can be expressed in the voxel form (x, y, z, datavalue) is suitable for use with the present invention. In addition to seismic data, examples from the oil and gas industry include information from closely spaced well logs, gravity and magnetic fields, remote sensing data, and sidescan sonar image data. Other geologic or physical information could also include temperature, pressure, saturation, reflectivity, acoustical impedance, and velocity.

Another application for the present invention is for mining. For example, the present invention can be used to visualize and interpret geologic and geophysical data to locate mining sites, to locate and track deposits to be mined, or to locate and track geologic features such as faults that would affect mining operations. The present invention also has application for clean up of toxic, hazardous, or other types of waste. For example, the present invention can be used to visualize and interpret data representing the geographic extent and distribution of the waste at a particular site. Such visualization and interpretation is useful for prioritizing clean up at various sites, and for developing a clean-up plan for a particular site.

The present invention can also be used with information outside of the oil and gas industry. For example, the present invention can be used for analyzing and imaging in the medical field, where the datavalue element of the voxel is obtained from a CAT (computerized axial tomography) scanner or a magnetic resonance imaging (MRI) procedure.

By way of explanation and example, the present invention will be described in detail below using 3D seismic data as the 3D volume data set. It is to be understood, however, that the present invention is not limited in any way to the use of 3D seismic data.

The present invention is particularly useful as a visualization tool for interpreting 3D seismic data. As used herein, the term "visualization" refers to the construction of a three-dimensional picture in the user's mind of physical or geologic features or physical parameters that are inherently present in 3D volume data sets. Such physical features or parameters are typically not apparent from conventional means of processing 3D data sets, such as scanning a series of cross-sections of the 3D volume data set, because of the mental reconstruction that needs to take place in order for a user to mentally "picture" the three-dimensional feature. Because of this mental reconstruction, it is difficult to communicate and share among users the same 3D image. For example, the same 3D mental image of the terrain will not necessarily be present in the mind of every person that reads or analyzes a two-dimensional ("2D") contour map of that terrain. Through the use of 3D computer graphics, users can visualize, and communicate and share, the same 3D image of 3D volume data sets. By visualizing 3D seismic data, a team of geologists, geophysicists, and engineers can interpret the visualized data to make exploration and production decisions, such as drilling locations and well paths.

To accomplish the visualization function, the present invention uses the computer graphics techniques of texture mapping and volume rendering. By "texture map" is meant wrapping or mapping a 2D picture or image onto a 2D or a 3D object. For example, a photograph of a person can be texture mapped onto a coffee cup.

The term "volume rendering" or "volume imaging" refers to drawing a three-dimensional object in a manner that conveys to a viewer the three-dimensional nature of the object, even though the viewer may be looking at a two-dimensional display or screen. Computer graphics technology makes use of coloring, lighting, and shading techniques to convey to the mind of the viewer what is high or low, behind or in front, light or dark, etc. The perspective or viewpoint can be changed so that the viewer can see all sides of the 3D object. Volume rendering typically includes some type of transparency/opacity (opacity=1−transparency) control so that certain parts of the 3D object are more transparent, thereby allowing a viewer to "see through" outer surfaces of an object and view its internal structures.

The present invention enables fast visualization and analysis of very large 3D volume data sets through the use of a "sampling probe", also referred to herein as a "probe" or "probe object". As explained in more detail below, the sampling probes of the present invention have numerous attributes, one of which is that they are typically created as a 3D sub-volume of the whole 3D volume data set to be visualized and analyzed.

A number of sampling probes can be created, shaped, sized, and moved interactively by the user within the whole 3D volume data set. The intersection of the sampling probe with the whole 3D volume data set is texture mapped onto the surfaces of the sampling probe, or volume rendered with varying degrees of transparency within the sampling probe. As used herein, the term "interactive" or "interactively" refers to changing or re-drawing an image in response to user input at a rate sufficiently fast that the user perceives an instantaneous or real-time change in the image, without perceptible delay or lag. In practice, a frame rate of at least about 10 to 15 frames per second is sufficient to achieve interactive imaging as described herein. For example, as the user moves the sampling probe, such as by "clicking and dragging" with a "mouse", the user perceives the texture on the surfaces of the sampling probe changing in "real-time" with movement of the sampling probe. As the sampling probe changes shape, size, or location, there is no user-perceivable delay or lag in imaging the texture, or, with varying degrees of transparency, volume-rendered attributes. In this manner, the user can interactively move the sampling probes through the whole 3D volume, and more easily and effectively visualize and interpret the features and physical parameters that are present within the geographic space represented by the whole 3D volume data set.

System Description

The present invention may be implemented using hardware, software or a combination thereof, and may be implemented in a computer system or other processing system. One embodiment of a software or program structure 100 for implementing the present invention is shown in FIG. 1. At the base of program structure 100 is an operating system 102. Suitable operating systems 102 include, for example, the UNIX® operating system, or Windows NT® from Microsoft Corporation, or other operating systems as would be apparent to one of skill in the relevant art.

Menu and windowing software 104 overlays operating system 102. Menu and windowing software 104 is used to provide various menus and windows to facilitate interaction with the user, and to obtain user input and instructions. Menu and windowing software 104 can include, for example, Microsoft Windows™, X Window System™ (registered trademark of Massachusetts Institute of Technology), and MOTIF™ (registered trademark of Open Software Foundation Inc.). As would be readily apparent to one of skill in the relevant art, other menu and windowing software could also be used.

A basic graphics library 106 overlays menu and windowing software 104. Basic graphics library 106 is an application programming interface (API) for 3D computer graphics. The functions performed by basic graphics library 106 include, for example, geometric and raster primitives, RGBA or color index mode, display list or immediate mode, viewing and modeling transformations, lighting and shading, hidden surface removal, alpha blending (translucency), anti-aliasing, texture mapping, atmospheric effects (fog, smoke, haze), feedback and selection, stencil planes, and accumulation buffer.

A particularly preferred basic graphics library 106 is OpenGL®, available from Silicon Graphics, Inc. ("SGI"), Mountain View, Calif. The OpenGL® API is a multiplatform industry standard that is hardware, window, and operating system independent. OpenGL® is designed to be callable from C, C++, FORTRAN, Ada and Java programming languages. OpenGL® performs each of the functions listed above for basic graphics library 106. Some commands in OpenGL® specify geometric objects to be drawn, and others control how the objects are handled. All elements of the OpenGL® state, even the contents of the texture memory and the frame buffer, can be obtained by a client application using OpenGL®. OpenGL® and the client application may operate on the same or different machines because OpenGL® is network transparent. OpenGL® is described in more detail in the OpenGL® Programming Guide (ISBN: 0-201-63274-8) and the OpenGL® Reference Manual (ISBN: 0-201-63276-4), the entirety of both of which are incorporated herein by reference.

Visual simulation graphics library 108 overlays basic graphics library 106. Visual simulation graphics library 108 is an API for creating real-time, multi-processed 3D visual simulation graphics applications. Visual simulation graphics library 108 provides functions that bundle together graphics library state control functions such as lighting, materials, texture, and transparency. These functions track state and the creation of display lists that can be rendered later.

A particularly preferred visual simulation graphics library 108 is IRIS Performer, available from SGI in Mountain View, Calif. IRIS Performer supports the OpenGL® graphics library discussed above. IRIS Performer includes two main libraries, libpf and libpr, and four associated libraries, libpfdu, libpfdb, libpfui, and libpfutil.

The basis of IRIS Performer is the performance rendering library libpr, a low-level library providing high speed rendering functions based on GeoSets and graphics state control using GeoStates. GeoSets are collections of drawable geometry that group same-type graphics primitives (e.g., triangles or quads) into one data object. The GeoSet contains no geometry itself, only pointers to data arrays and index arrays. Because all the primitives in a GeoSet are of the same type and have the same attributes, rendering of most databases is performed at maximum hardware speed. GeoStates provide graphics state definitions (e.g., texture or material) for GeoSets.

Layered above libpr is libpf, a real-time visual simulation environment providing a high-performance multi-process database rendering system that optimizes use of multiprocessing hardware. The database utility library, libpfdu, provides functions for defining both geometric and appearance attributes of 3D objects, shares state and materials, and generates triangle strips from independent polygonal input. The database library libpfdb uses the facilities of libpfdu, libpf, and libpr to import database files in a number of industry standard database formats. The libpfui is a user interface library that provides building blocks for writing manipulation components for user interfaces (C and C++ programming languages). Finally, the libpfutil is the utility library that provides routines for implementing tasks such as MultiChannel Option support and graphical user interface (GUI) tools.

An application program that uses IRIS Performer and OpenGL® API typically carry out the following steps in preparing for real-time 3D visual simulation:

1. Initialize IRIS Performer;
2. Specify number of graphics pipelines, choose the multiprocessing configuration, and specify hardware mode as needed;
3. Initialize chosen multiprocessing mode;
4. Initialize frame rate and set frame-extend policy;
5. Create, configure, and open windows as required; and
6. Create and configure display channels as required.

Once the application program has created a graphical rendering environment by carrying out steps 1 through 6 above, then the application program typically iterates through a main simulation loop once per frame.

7. Compute dynamics, update model matrices, etc.;
8. Delay until the next frame time;
9. Perform latency critical viewpoint updates;
10. Draw a frame.

A 3D sampling probe program 110 of the present inventions overlays visual simulation graphics library 108. Program 110 interacts with, and uses the functions carried out by, each of visual simulation and graphics library 108, basic graphics library 106, menu and windowing software 104, and operating system 102 in a manner known to one of skill in the relevant art.

3D sampling probe program 110 of the present invention is preferably written in an object oriented programming language to allow the creation and use of objects and object functionality. A particularly preferred object oriented programming language is C++. In carrying out the present invention, program 110 creates one or more probe "objects". As noted above, the probe objects created and used by program 110 are also referred to herein as sampling probes or probes. Program 110 manipulates the probe objects so that they have the following attributes.

A probe corresponds to a sub-volume of a larger 3D volume. Particularly, a probe defines a sub-set that is less than the complete data set of voxels for a 3D volume data set. A probe could be configured to be equal to or coextensive with the complete data set of voxels for a 3D volume data set, but the functionality of the present invention is best carried out when the probe corresponds to a sub-volume and defines a sub-set that is less than the complete data set of voxels for a 3D volume data set. For example, a 3D volume data set of seismic data can contain from about 500 MB (megabytes) to about 10 GB (gigabytes) or more of data. A 2,500 square kilometer geographic space of typical 3D seismic data contains about 8 GB of data. A probe of the present invention for a 500 MB seismic data set would preferably contain about 10-20 MB of data.

By using probes that are a sub-volume of the larger 3D volume, the quantity of data that must be processed and re-drawn for each frame of an image is dramatically reduced, thereby increasing the speed with which the image can be re-drawn. The volume of a three-dimensional cube is proportional to the third power or "cube" of the dimensions of the three-dimensional cube. Likewise, the quantity of data in a 3D volume data set is proportional to the third power or "cube" of its size. Therefore, the quantity of data in a sub-volume of a larger 3D volume will be proportional to the "cubed root" ($\sqrt[3]{}$) of the quantity of data in the larger 3D volume. As such, the quantity of data in a probe of the present invention will be proportional to the "cubed root" ($\sqrt[3]{}$) of the quantity of data in the 3D volume of which it is a sub-volume. By only having to process the sub-set of data that relates to the sub-volume of the probe, the present invention can re-draw an image in response to user input at a rate sufficiently fast that the user perceives an instantaneous or real-time change in the image, without perceptible delay or lag.

The probes of the present invention can be interactively changed in shape and/or size, and interactively moved within the larger 3D volume. The outside geometry or surfaces of a probe can be interactively drawn opaque or texture mapped while the probe is being changed in shape and/or size or while the probe is being moved. The probe can be drawn or volume rendered with varying degrees of transparency while the probe is being changed in shape and/or size or moved, thereby revealing the internal structures or features of the probe.

The 3D sampling probes of the present invention can have any shape, including rectangular shapes having one or more right angles and non-rectangular shapes having no right angles. The 3D sampling probes of the present invention can have orthogonal or perpendicular planes as outer surfaces (e.g., squares and rectangles), parallel planes as outer surfaces (e.g., parallelograms), or curved outer surfaces (e.g., spheres, ovals, or cylinders). The present invention is not limited to 3D sampling probes of any particular shape. The 3D sampling probes of the present invention can have arbitrary shapes, such as the shape of a geologic feature identified by a user. For example, as a user moves the 3D sampling probe through a 3D volume of seismic data, a geologic feature may be visualized and identified by the user. The 3D sampling probe can be interactively re-shaped by the user to match the shape of the geologic feature, thereby enabling the user to better visualize and define the extent of that geologic feature.

A probe can be used to cut into another probe, and the intersection of the two probes can be imaged. A probe can be used to highlight data in accordance with a seed selection algorithm. A probe can also be used to "erase" or delete data in accordance with a seed de-selection algorithm. These attributes will be explained in more detail below.

Figure 2:
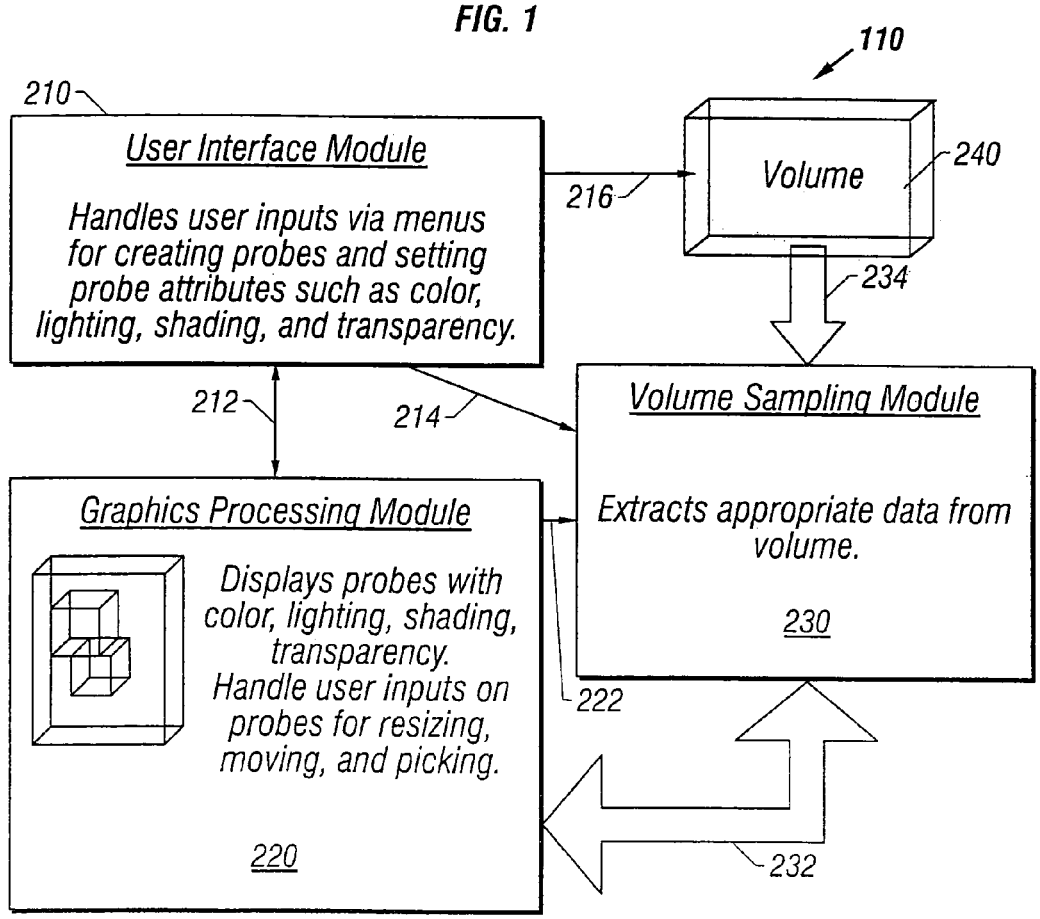
FIG. 2 shows a block diagram of one embodiment of the 3D sampling probe program of the present invention.

FIG. 2 shows a block diagram of one embodiment of 3D sampling probe program 110. Program 110 includes a User Interface Module (UIM) 210, a Graphics Processing Module (GPM) 220, and a Volume Sampling Module (VSM) 230. A 3D volume data set is illustrated as data volume 240, also referred to herein as a 3D volume. UIM 210 and GPM 220 communicate via a bi-directional pathway 212. GPM 220 sends instructions and requests for data to VSM 230 via pathway 222. UIM 210 sends instructions and requests to VSM 230 via pathway 214. UIM 210 interacts with data volume 240 through pathway 216.

Voxel data from data volume 240 is transferred to VSM 230 via data pathway 234. VSM 230 transfers data to GPM 220 via data pathway 232. Data volume 240 stores the 3D volume data set in a manner well known to one of skill in the relevant art. For example, the format for data volume 240 can consist of two parts, a volume header followed by the body of data that is as long as the size of the data set. The volume header typically contains information, in a prescribed sequence, such as the file path (location) of the data set, size, dimensions in the x, y, and z directions, annotations for the x, y, and z axes, annotations for the datavalue, etc. The body of data is a binary sequence of bytes, one or more bytes per data value, that can be ordered in the following manner. The first byte is the datavalue at volume location (x, y, z)=(0,0,0). The second byte is the datavalue at volume location (1,0,0), the third byte is the datavalue at volume location (2,0,0), etc. When the x dimension is exhausted, then the y dimension is incremented, and finally the z dimension is incremented. The present invention is not limited in any way to a particular data format for data volume 240.

User Interface Module 210 handles the user interface to receive commands, instructions, and input data from the user. UIM 210 interfaces with the user through a variety of menus through which the user can select various options and settings, either through keyboard selection or through one or more user-manipulated input devices, such as a "mouse", or a 3D pointing device. UIM 210 receives user input as the user manipulates the input device to move, size, shape, etc. a 3D sampling probe.

The primary functions carried out by UIM 210 will now be described. UIM 210 inputs from the user the identification of one or more 3D volume data sets (represented by data volume 240) to use for imaging and analysis. When a plurality of data volumes are used, the datavalue for each of the plurality of data volumes represents a different physical parameter or attribute for the same geographic space. By way of example, a plurality of data volumes could include a geology volume, a temperature volume, and a water-saturation volume. The voxels in the geology volume can be expressed in the form (x, y, z, seismic amplitude). The voxels in the temperature volume can be expressed in the form (x, y, z, ° C.).

The voxels in the water-saturation volume can be expressed in the form (x, y, z, % saturation). The physical or geographic space defined by the voxels in each of these volumes is the same. However, for any specific spatial location ($x_0$, $y_0$, $z_0$), the seismic amplitude would be contained in the geology volume, the temperature in the temperature volume, and the water-saturation in the water-saturation volume.

Figure 3:
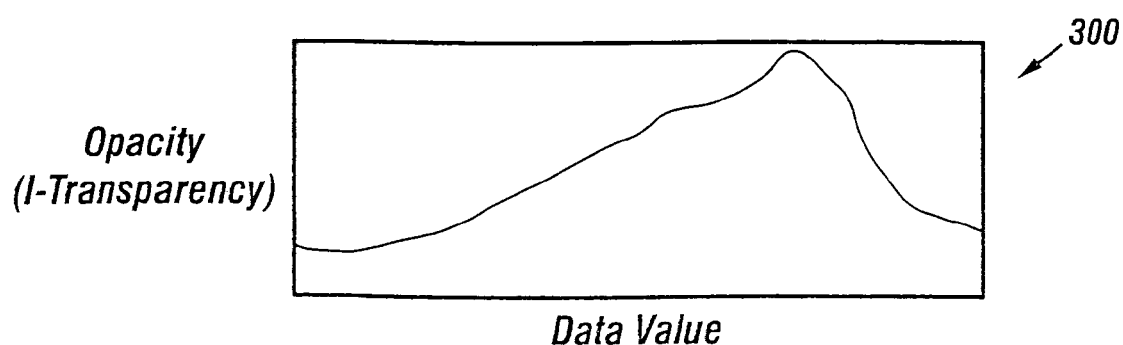
FIG. 3 shows a curve illustrating opacity as a function of datavalue.

UIM 210 inputs from the user information to create one or more 3D sampling probes. Such information includes size, shape, and initial location of the probe. Such information can also include imaging attributes such as color, lighting, shading, and transparency (or opacity). By adjusting opacity as a function of datavalue, certain portions of the data volume are more transparent, thereby allowing a viewer to see through surfaces. An exemplary opacity curve 300 is shown in FIG. 3. Opacity curve 300 illustrates opacity (1−transparency) as a function of datavalue. As would be readily apparent to one skilled in the art, datavalues with greater opacity (less transparency) will mask the imaging or display of datavalues with lower opacity (more transparency). Conversely, datavalues will less opacity and greater transparency will permit the imaging or display of datavalues with greater opacity and lower transparency.

UIM 210 receives input from the user for sizing and shaping the 3D sampling probes. As described in more detail below, in a preferred embodiment of the present invention, the user changes the shape and/or size of a probe by clicking onto "sizing tabs" on the probe, and making changes in the dimensions of the probe in one or more directions. UIM 210 receives input from the user to move the position or location of a 3D sampling probe within the data volume. In a preferred embodiment, a user manipulates a mouse to "click" onto a surface of the probe to be moved, and then moves the mouse to move the probe throughout the geographic space defined by the data volume.

UIM 210 receives input from the user to carry out "auto picking" processes. In an auto picking process, data points (voxels) are selected based upon a selection algorithm. In a preferred embodiment, the selection algorithm is based upon a seed point within the 3D data volume. The selection algorithm then selects data points that: (i) satisfy the selection criteria or algorithm (e.g., have a datavalue within a specified filter range); and (ii) have a connectivity with or are connected to the seed point. Through UIM 210, the user is prompted to identify a seed point within the 3D volume, and to identify a filter range of datavalues used by the selection algorithm to "pick" the selected points. Preferably, the seed point is within one of the 3D sampling probes.

UIM 210 also receives input from the user regarding the content of the displayed image. For example, the user can preferably select the content of the displayed image. The content of the displayed image could include only the 3D sampling probe, i.e., its intersection with the 3D volume. Additionally, the 3D sampling probe could be displayed either with or without a bounding box that defines the outer geometry of the probe. Alternatively, the displayed image could include the 3D sampling probe, as well as the data that occupies the background xz, yz, and xy planes, and/or the data that occupies the 3D volume outside of the 3D sampling probe(s) being displayed.

To carry out the foregoing functions, UIM 210 sends a request to Volume Sampling Module 230 to load or attach those 3D volume data sets identified by the user. UIM 210 communicates via pathway 212 with Graphics Processing Module 220 that carries out the display and imaging.

The primary functions carried out by GPM 220 will now be described. GPM 220 processes data for imaging of 3D sampling probes with the color, lighting, shading, transparency, and other attributes selected by the user. To do so, GPM 220 uses the functions available through basic graphics library 106 and visual simulation graphics library 108 described above. The user can select (through UIM 210) to display only the one or more 3D sampling probes that have been created. Alternatively, the user can select to display one or more 3D sampling probes, as well as the 3D data volume outside of the probes, i.e. voxels within the 3D volume that do not intersect any of the 3D sampling probes that are being displayed. 3D sampling probes that are being displayed are referred to herein as "active probes".

GPM 220 processes the re-shaping and move requests that are received by UIM 210 from the user. GPM 220 draws the re-shaped 3D sampling probe in accordance with the user-selected attributes (color, lighting, shading, transparency, etc.). As the user inputs a change in shape for a 3D sampling probe, the image with selected attributes is re-drawn sufficiently fast to be perceived as real-time by the user. Similarly, GPM 220 draws the 3D sampling probe in the new position or location in accordance with the user-selected attributes (color, lighting, shading, transparency, etc.). As the user moves the 3D sampling probe through the 3D volume, the image of the 3D sampling probe with selected attributes is re-drawn sufficiently fast to be perceived as real-time by the user.

GPM 220 processes "auto picking" requests that are received by UIM 210. GPM 220 will image selected points within the 3D volume in accordance with the selection algorithm. Alternatively, GPM 220 will "erase" selected points within the 3D volume in accordance with the selection algorithm.

To carry out the foregoing functions, GPM 220 communicates via pathway 212 with UIM 210 so that the information requested by the user is imaged or displayed with the selected attributes. GPM 220 obtains the needed data from data volume 240 by sending a data request via pathway 222 to Volume Sampling Module (VSM) 230.

The primary function of VSM 230 is to extract the appropriate data from data volume 240 at the request of GPM 220. VSM 230 receives requests for data from GPM 220 via pathway 222. VSM 230 extracts the required data from data volume 240 and transfers the data to GPM 220 via data pathway 232 for processing and display. VSM 230 also receives instructions from UIM 210 via pathway 214 to load or attach the 3D data volumes identified by the user.

Figure 4:
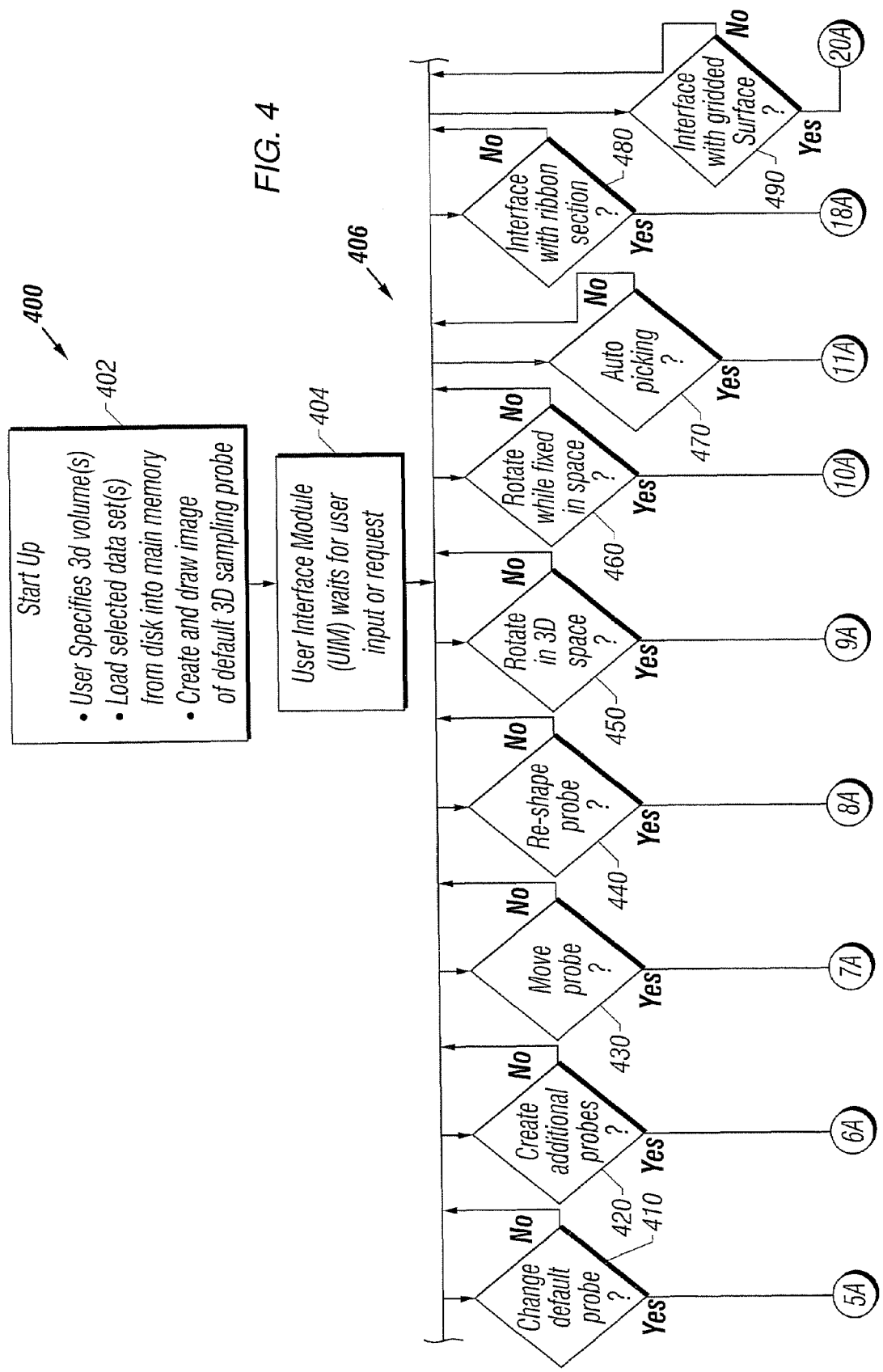
FIG. 4 shows a flow diagram illustrating one embodiment for implementing the present invention.

Turning now to FIG. 4, a flow diagram 400 illustrating one embodiment for implementing the present invention is shown. A start up or initialization process is shown in a step 402. In step 402, the user specifies the one or more data volumes (240) to be used. The specified 3D volume data sets are loaded from disk into main memory (a description of hardware suitable for carrying out the present invention will be described in more detail below). A default 3D sampling probe is created, and drawn. The default 3D sampling probe is a sub-volume of the specified 3D volume(s) of arbitrary size and shape. The present invention is not limited to any particular size or shape for the default 3D sampling probe.

By way of example of the present invention, the default 3D sampling probe can be a square (having equal dimensions in the x, y, and z directions). To draw the square default 3D sampling probe, the bounding geometry is first drawn with one edge of the bounding geometry located on the z axis. Data is then extracted from data volume 240 by VSM 230 to draw the image of the intersection of the square default 3D sampling probe with the 3D volume (data volume 240). Particularly, data is extracted that corresponds to the intersection of the square default 3D sampling probe with the 3D volume in the xz, yz, and xy planes. This data is then sent by VSM 230 to GPM 220 so that it can be texture mapped onto the planes of the bounding box to provide an image of the square default 3D sampling probe.

In one embodiment of the present invention, the data that occupies the background xz, yz, and xy planes themselves, as well as the data that occupies the 3D volume outside of the default 3D sampling probe, are also imaged or displayed (in addition to the default 3D sampling probe) during start up step 402. Alternatively, start up step 402 can be carried out so that the data that occupies the background xz, yz, and xy planes, or the data that occupies the 3D volume outside of the default 3D sampling probe, is not displayed or imaged. Preferably, the present invention is carried out so that the user can selectively display, or not display, the data that occupies the background xz, yz, and xy planes, as well as the data that occupies the 3D volume outside of the active probes.

In a step 404, UIM 210 is waiting to respond to user input or request. User input is received through a user input device suitable for use with a computer, including but not limited to, a keyboard, mouse, joystick, trackball, rollerball, roller point, or other type of suitable pointing device, etc. Preferably, the user input device comprises a mouse or other similar device that enables the user to "click" on a particular displayed image, and "drag" that displayed image to another location. Such a user input device allows a user to move and re-shape displayed probes. Such a user input device also allows a user to activate drop-down menus, and to select the various options for the color, shading, lighting, and transparency attributes. A keyboard can also be used for entering information relating to the selected attributes.

Reference numeral 406 refers generally to a plurality of functions that can be carried out by the present invention. These functions can be carried out individually or simultaneously, depending upon input from the user. For example, a probe can be moved (function 430) and rotated (function 450) simultaneously. While the functions identified by reference numeral 406 are being carried out, the image of the 3D sampling probes is being re-drawn sufficiently fast to be perceived as real-time by the user. Each of the functions identified by reference numeral 406 will now be described.

Figure 5:
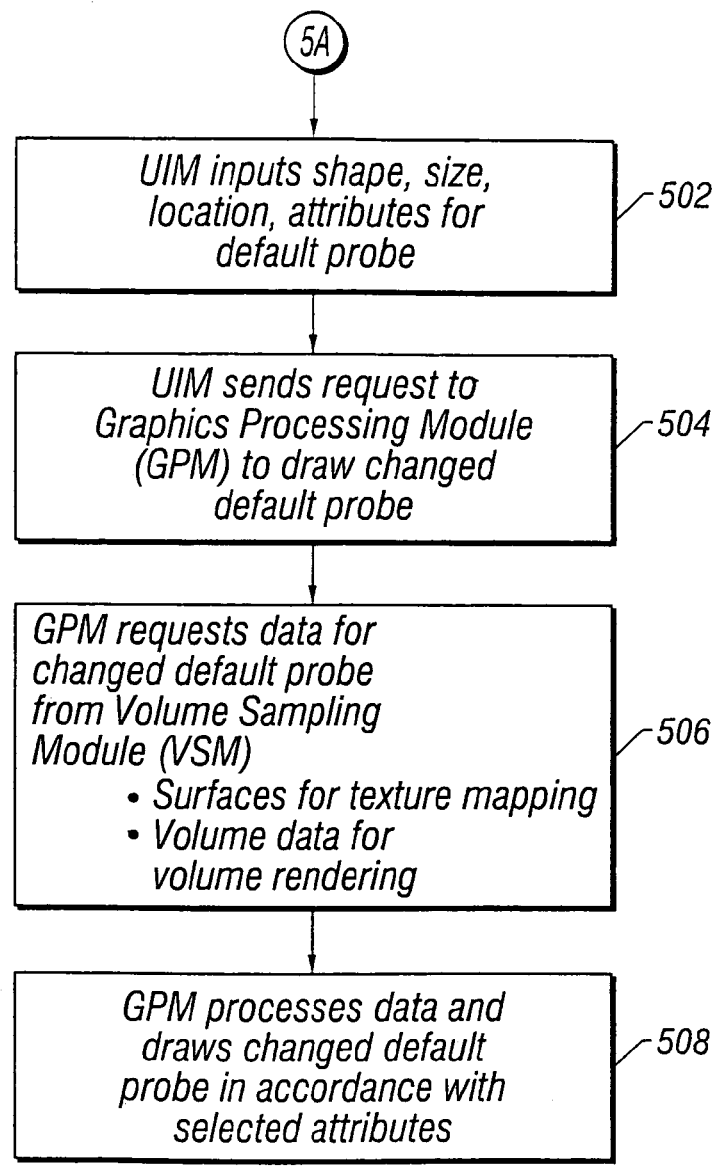
FIG. 5 shows a flow diagram of one embodiment for changing a default probe.

If a user wants to change the default probe, then function 410 is carried out. The steps for carrying out function 410 are shown in FIG. 5 by way of flow diagram connector 5A. In a step 502, the changes to the default probe are input by UIM 210 from the user. For example, the changes to the default probe can be to the shape or size, the location, or the attributes such as color, shading, lighting, and transparency.

In a step 504, UIM 210 sends a request to GPM 220 to draw the changed default probe. In a step 506, GPM 220 requests data for the changed default probe from VSM 230. In making this request, GPM 220 would invoke function 430 if it was necessary to move the default probe, function 440 to re-shape the default probe, and functions 450 or 460 to rotate the default probe. The foregoing functions will be described in more detail below.

The data that will be extracted from data volume 240 by VSM 230 in response to the request made by GPM 220 in step 506 will depend upon attributes that have been selected by the user. If the opacity settings selected by the user are such that all datavalues are opaque, then the data extracted by VSM 230 will be limited to the surfaces of the changed default probe. Because of the selected opacity, it will not be possible for the user to see inside the changed default probe, so only the data corresponding to the surfaces or outside of the changed default probe will be extracted by VSM 230. In a step 508, GPM 220 processes the data extracted by VSM 230 for the surfaces of the changed default probe, and draws the changed default probe by texture mapping onto the surfaces in accordance with the attributes selected by the user. By extracting only the data that can be seen by the user, the image of the changed default probe can be drawn more quickly because less data needs to be processed, i.e., the data corresponding to the "inside" of the changed default probe is not processed.

Alternatively, if the opacity settings selected by the user are such that some of the datavalues are opaque and some of the datavalues are transparent, then the data extracted by VSM 230 will include the data corresponding to the entire volume of the changed default probe. Because of the selected opacity and transparency, it will be possible for the user to see inside the changed default probe, so data corresponding to the entire volume of the changed default probe will be extracted by VSM 230. In such a situation, GPM 220 processes the data extracted by VSM 230 in step 508, and draws the changed default probe by volume rendering in accordance with the attributes selected by the user.

Figure 6:
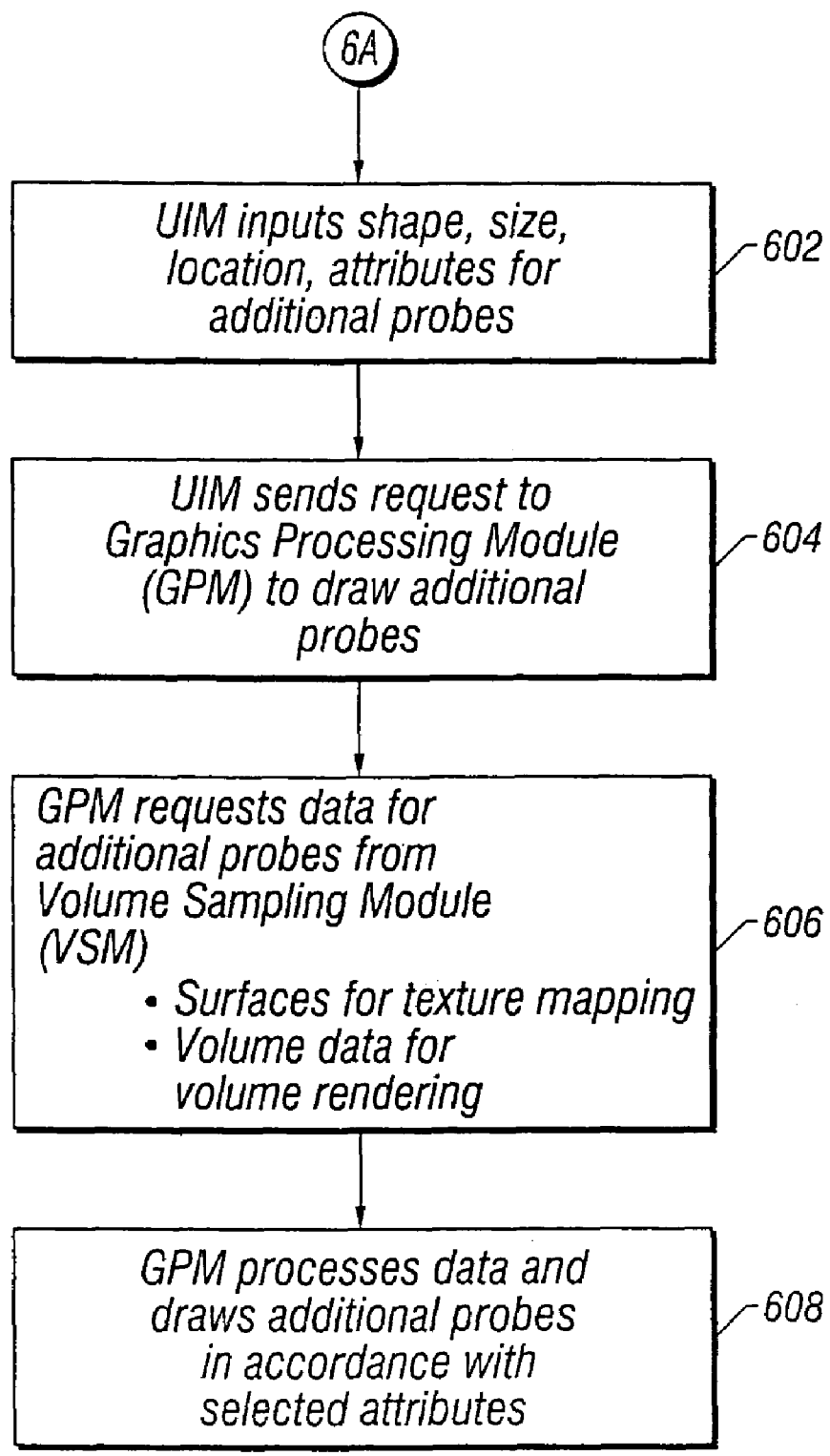
FIG. 6 shows a flow diagram of one embodiment for creating additional probes.

If a user wants to create additional probes, then function 420 is carried out. The present invention is not limited to any particular number of active probes. The steps for carrying out function 420 are shown in FIG. 6 by way of flow diagram connector 6A. In a step 602, the shape, size, location, attributes, etc. for the additional probes are input by UIM 210 from the user. In a step 604, UIM 210 sends a request to GPM 220 to draw the additional probes.

In a step 606, GPM 220 requests data for the additional probes from VSM 230. In a manner similar to that described above for changing the default probe, the data that is extracted from 3D or data volume 240 by VSM 230 will depend upon the opacity selected by the user for the additional probes. If the opacity settings selected by the user are such that all datavalues for the additional probes are opaque, then the data extracted by VSM 230 will be limited to the surfaces of the additional probes. Alternatively, if the opacity settings selected by the user for the additional probes are such that some of the datavalues are opaque and some of the datavalues are transparent, then the data extracted by VSM 230 will include the data corresponding to the entire volumes of the additional probes. In this manner, the additional probes can be drawn more quickly by minimizing the quantity of data that must be processed.

In a step 608, GPM 220 processes the data extracted by VSM 230 for the additional probes, and draws the additional probes in accordance with the attributes selected by the user, either by texture mapping onto the surfaces of the additional probes, or by volume rendering the entire volume of the additional probes.

Figure 7:
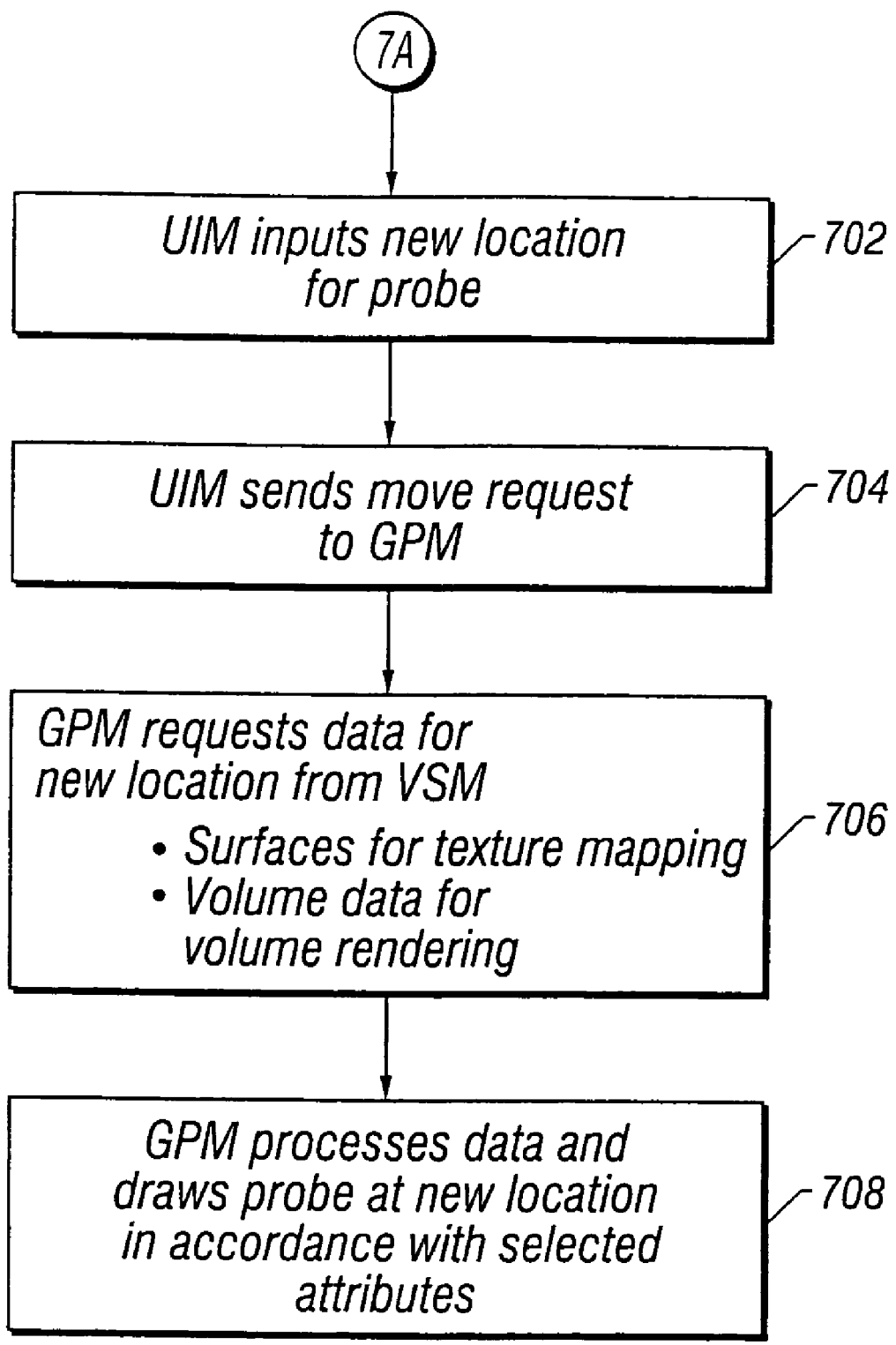
FIG. 7 shows a flow diagram of one embodiment for moving a probe.

If a user wants to move a probe, then function 430 is carried out. The steps for carrying out function 430 are shown in FIG. 7 by way of flow diagram connector 7A. In a step 702, the new location for the probe is input by UIM 210 from the user. In a preferred embodiment of the present invention, the user inputs the new location of the probe by clicking a mouse or other type of suitable user input device to snap a pointer onto a surface of the probe to be moved. The user changes the location of the probe by moving the mouse or other suitable user input device in any direction, thereby dragging the probe along a trajectory.

In a step 704, UIM 210 sends a move request to GPM 220 to draw the probe at the new location. GPM 220 requests data for the new location of the probe from VSM 230. In a manner similar to that described above, the data that is extracted from data volume 240 by VSM 230 will depend upon the opacity selected by the user for the probe being moved. If the opacity settings selected by the user are such that all datavalues for the probe being moved are opaque, then the data extracted by VSM 230 will be limited to the surfaces of the probe being moved. Alternatively, if the opacity settings selected by the user for the probe being moved are such that some of the datavalues are opaque and some of the datavalues are transparent, then the data extracted by VSM 230 will include the data corresponding to the entire volume of the probe being moved. In this manner, the probe can be drawn at its new location more quickly by minimizing the quantity of data that must be processed.

In a step 708, GPM 220 processes the data extracted by VSM 230 for the probe being moved, and draws the probe at its new location in accordance with the attributes selected by the user, either by texture mapping onto the surfaces of the probe being moved, or by volume rendering the entire volume of the probe being moved.

As the user moves the probe, for each new location of the probe, steps 702 through 708 are repeated at a rate sufficiently fast that the user perceives the image of the probe, with texture mapping or volume rendering as appropriate, changing in "real-time" with movement of the probe. The image is being re-drawn at a frame rate sufficiently fast to be perceived as real-time by the user.

If a user wants to re-shape a probe, then function 440 is carried out. As used herein, the term "re-shape" refers to any change in dimension of a 3D sampling probe in any direction. The shape of a 3D sampling probe can be changed, or re-shaped, for example, by changing the size in one or more directions, such as by changing a square probe into a rectangular probe by increasing the size of the probe in the x direction, and decreasing the size of the probe in the y direction. As another example, the shape of a 3D sampling probe can be changed by changing the shape from spherical to rectangular. As yet another example, a square 3D sampling probe (equal dimensions in the x, y, and z directions) can be re-shaped in accordance with the present invention to be a larger or smaller square-shaped probe by changing the size equally in each of the x, y, and z directions. The re-shaped probe also has a square shape, but as a larger or smaller square.

Figure 8:
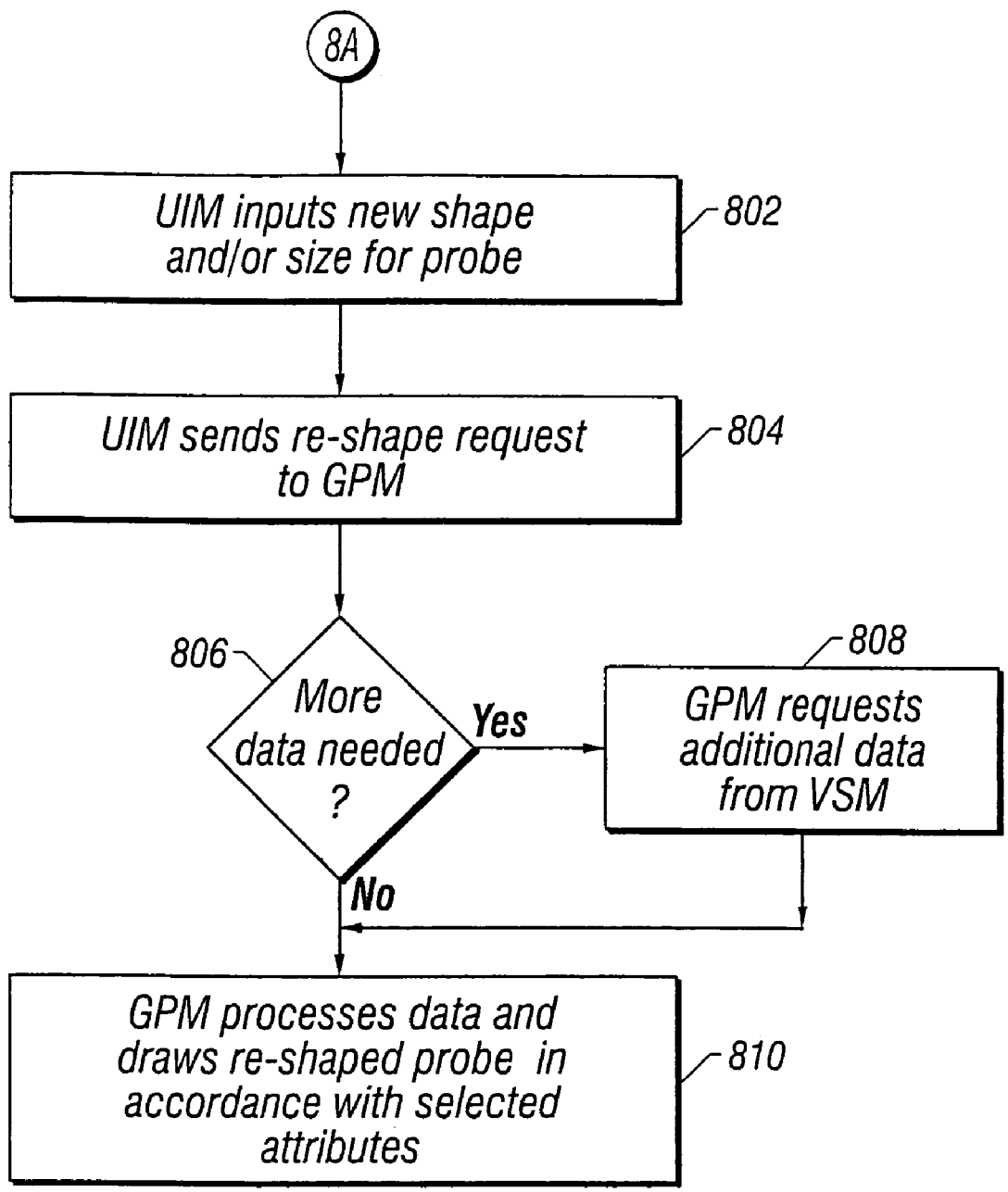
FIG. 8 shows a flow diagram of one embodiment for re-shaping a probe.
Figure 15:
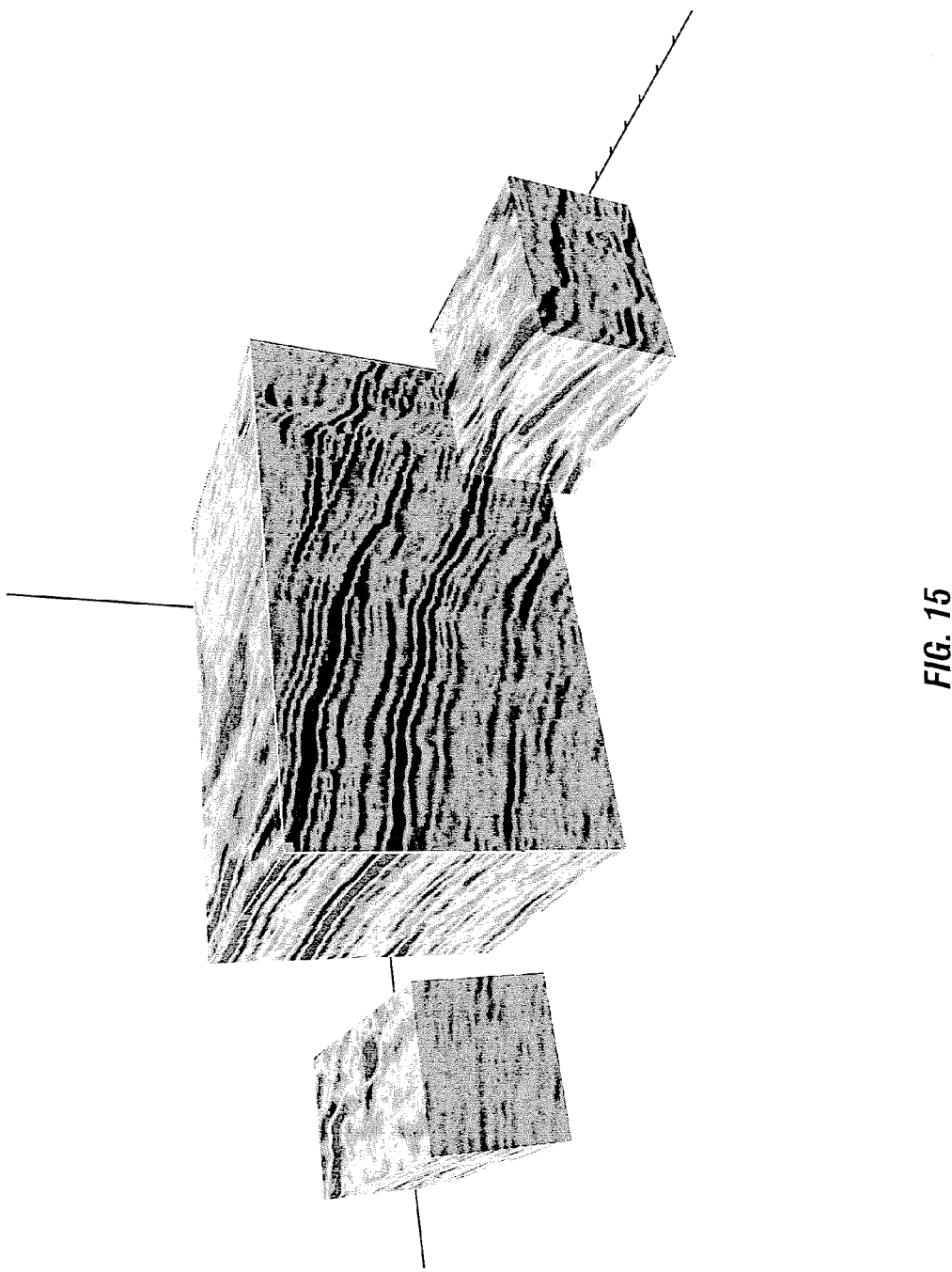
FIG. 15 illustrates three opaque probes of the present invention, with two of the probes intersecting each other.
Figure 16:
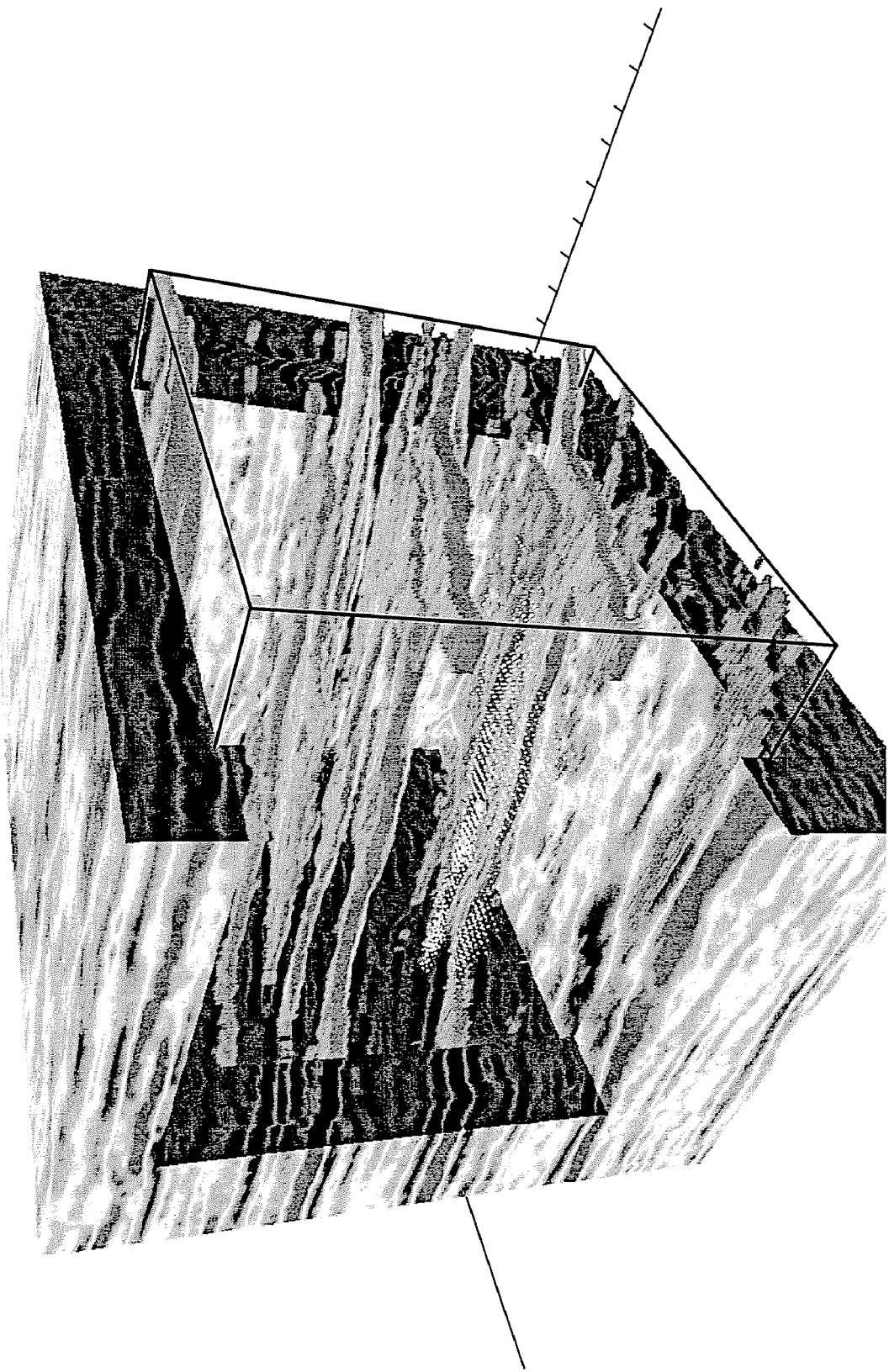
FIG. 16 illustrates three probes of the present invention, a data probe, a transparent cut probe, and a volume-rendered probe.

The steps for carrying out function 440 are shown in FIG. 8 by way of flow diagram connector 8A. In a step 802, the new shape and/or size for the probe is input by UIM 210 from the user. In a preferred embodiment of the present invention, the user inputs the new shape of a probe by clicking a mouse or other type of suitable user input device to snap a pointer onto a "sizing tab" of the probe to be re-shaped. As used herein, a "sizing tab" refers to a designated area on a surface of the probe. Such a designated area is preferably displayed in a color that is different from the colors being used to display the features or physical parameters of the 3D volume data set. When the pointer is snapped to the sizing tab, manipulation of the mouse or user input device changes the dimensions or proportions of the surface on which the sizing tab is located. When the desired size or shape is reached, the user again clicks the mouse or user input device to release the pointer from the sizing tab. Sizing tabs are illustrated in FIGS. 15 and 16. The sizing tabs are the small dark squares that appear on the surfaces of the probes, along the bounding geometry of the probes. The location of the sizing tabs is not limited to the bounding geometry of the probes. The user changes the shape of the probe by clicking the mouse or other suitable user input device onto a sizing tab, moving the mouse until the surface being changed has the desired shape, and then releasing the mouse from the sizing tab. This process can be repeated, if necessary, using other sizing tabs on the probe until the probe is re-shaped to the desired shape.

It would be readily apparent to one of skill in the relevant art how to implement such a sizing tab for re-shaping the probes of the present invention. It is to be understood, however, that the present invention is not limited to the use of sizing tabs for re-shaping probes, and other suitable methods can be used. For example, the user could select from a number of pre-set shapes (e.g., squares, rectangle, cylinders, spheres) by activating a drop-down menu, or by scrolling through the shapes by repeatedly clicking a mouse.

In a step 804, UIM 210 sends a re-shape request to GPM 220 to draw the re-shaped probe. In a step 806, it is determined whether more data is needed to draw the re-shaped probe. For example, if the re-shaped probe is of a shape and size that "fits inside" the existing probe, then no more data is needed, and processing continues at a step 810. Alternatively, if the re-shaped probe is of a shape and size that falls at least partially outside of the existing probe, then, in a step 808, GPM 220 requests the data needed for the re-shaped probe from VSM 230. In a manner similar to that described above, the data that is extracted from 3D or data volume 240 by VSM 230 will depend upon the opacity selected by the user for the probe being re-shaped. If the opacity settings selected by the user are such that all datavalues for the probe being re-shaped are opaque, then the data extracted by VSM 230 will be limited to the surfaces of the probe being re-shaped. Alternatively, if the opacity settings selected by the user for the probe being re-shaped are such that some of the datavalues are opaque and some of the datavalues are transparent, then the data extracted by VSM 230 will include the data corresponding to the entire volume of the probe being re-shaped. In this manner, the probe can be drawn with its new shape more quickly by minimizing the quantity of data that must be processed.

In step 810, GPM 220 processes the data extracted by VSM 230 for the probe being re-shaped, and draws the probe with its new shape in accordance with the attributes selected by the user, either by texture mapping onto the surfaces of the probe being re-shaped, or by volume rendering the entire volume of the probe being re-shaped.

As the user changes the shape of the probe, steps 802 through 810 are repeated at a rate sufficiently fast that the user perceives the image of the probe, with texture mapping or volume rendering as appropriate, changing in "real-time" with the changing shape of the probe. The image is being re-drawn at a frame rate sufficiently fast to be perceived as real-time by the user.

Figure 9:
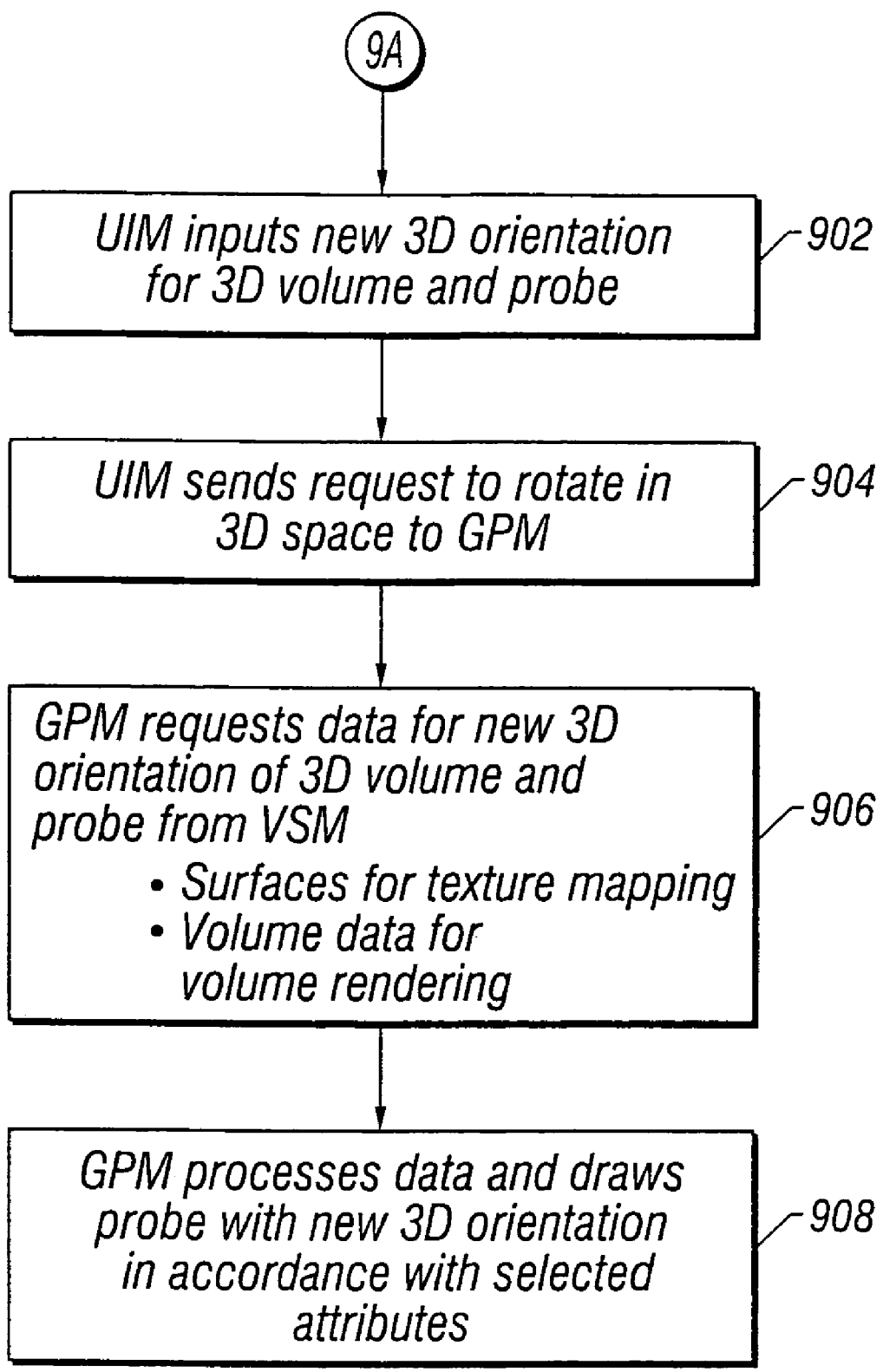
FIG. 9 shows a flow diagram of one embodiment for rotating a probe in 3D space.

If a user wants to rotate a probe in 3D space, then function 450 is carried out. In function 450, the 3D orientation, which is the same for both the 3D volume and the probe, is changed, thereby rotating the 3D volume and the probe in space. The steps for carrying out function 450 are shown in FIG. 9 by way of flow diagram connector 9A. In a step 902, the new 3D orientation for the 3D volume and the probe is input by UIM 210 from the user. In a preferred embodiment of the present invention, the user inputs the new orientation by clicking a mouse or other type of suitable user input device to snap a pointer onto an axis of the probe to be rotated. Manipulation of the mouse or user input device changes the orientation of that axis. When the desired orientation is reached, the user again clicks the mouse or user input device to release the pointer from the axis. It would be readily apparent to one of skill in the relevant art how to implement such a change in orientation. It is to be understood, however, that the present invention is not limited to changing the orientation in this manner. For example, the user could select from a number of pre-set rotations (e.g., rotate 90° to the left or right; rotate 45° to the left or right, etc.) by activating a drop-down menu, or by scrolling through the rotations by repeatedly clicking a mouse.

In a step 904, UIM 210 sends a request to rotate in 3D space to GPM 220 to draw the rotated probe. In a step 906, GPM 220 requests data for the rotated probe from VSM 230. In a manner similar to that described above, the data that is extracted from 3D or data volume 240 by VSM 230 will depend upon the opacity selected by the user for the probe being rotated. If the opacity settings selected by the user are such that all datavalues for the probe being rotated are opaque, then the data extracted by VSM 230 will be limited to the surfaces of the probe being rotated. Alternatively, if the opacity settings selected by the user for the probe being rotated are such that some of the datavalues are opaque and some of the datavalues are transparent, then the data extracted by VSM 230 will include the data corresponding to the entire volume of the probe being rotated. In this manner, the probe can be drawn with its new orientation more quickly by minimizing the quantity of data that must be processed.

In step 908, GPM 220 processes the data extracted by VSM 230 for the probe being rotated, and draws the probe with its new orientation in accordance with the attributes selected by the user, either by texture mapping onto the surfaces of the probe being rotated, or by volume rendering the entire volume of the probe being rotated.

As the user rotates the probe in 3D space, steps 902 through 908 are repeated at a rate sufficiently fast that the user perceives the image of the probe, with texture mapping or volume rendering as appropriate, changing in "real-time" with the changing orientation of the probe. The image is being re-drawn at a frame rate sufficiently fast to be perceived as real-time by the user.

If a user wants to rotate a probe while it is fixed in 3D space, then function 460 is carried out. In function 460, the 3D orientation of the probe is rotated independently of the 3D orientation of the 3D volume, thereby rotating the probe while it is fixed in the 3D space defined by the orientation of the 3D volume. In this manner, the background planes for an active probe can be displayed in a fixed orientation, and the active probe can be rotated within the background planes.

Figure 10:
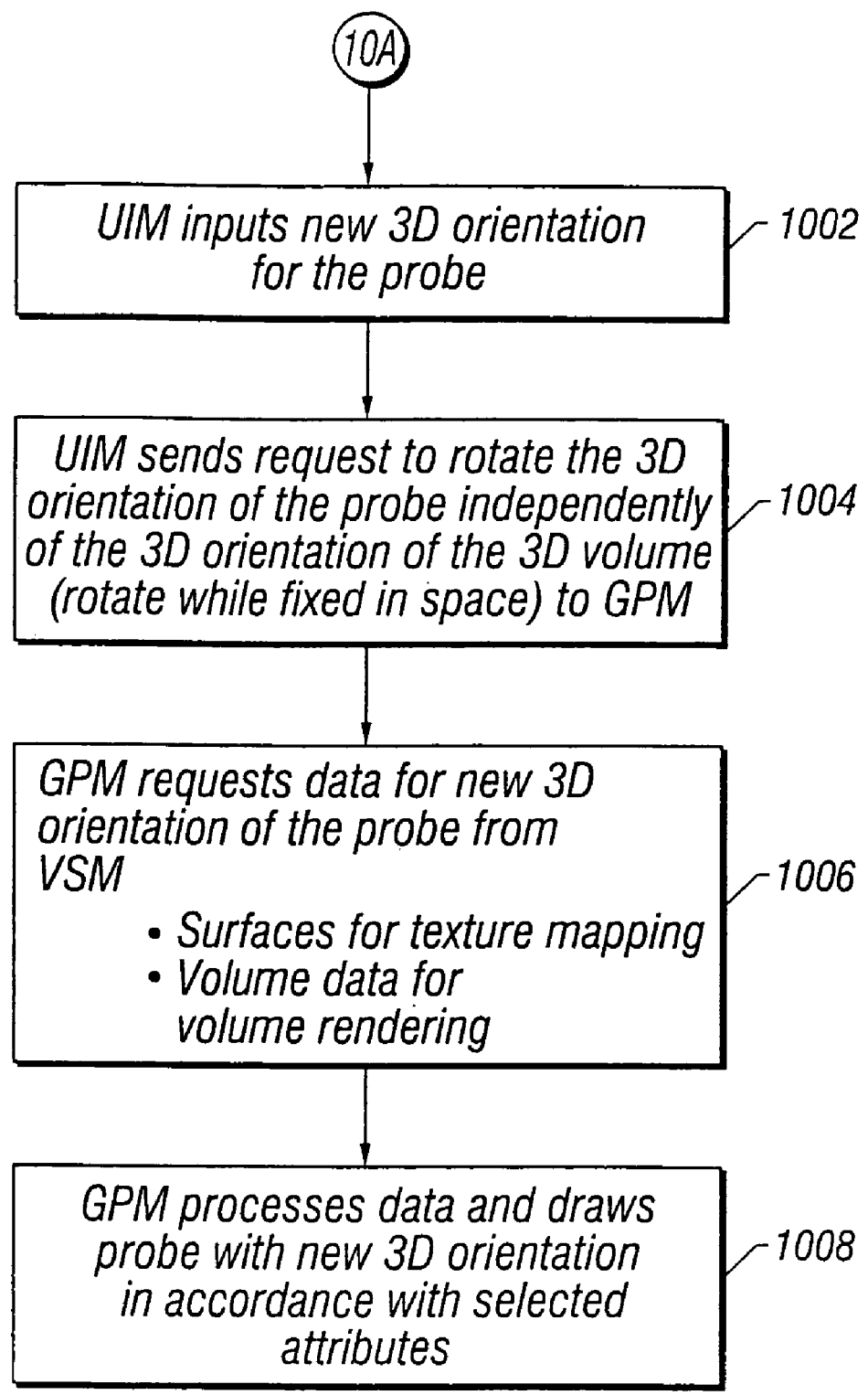
FIG. 10 shows a flow diagram of one embodiment for rotating a probe while fixed in space.

The steps for carrying out function 460 are shown in FIG. 10 by way of flow diagram connector 10A. In a step 1002, the new 3D orientation for the probe is input by UIM 210 from the user. In a preferred embodiment of the present invention, the user selects the option to rotate while fixed in space, for example, from a "drop-down" menu. The user then inputs the new orientation for the probe by clicking a mouse or other type of suitable user input device to snap a pointer onto an axis of the probe to be rotated. Manipulation of the mouse or user input device changes the orientation of that axis. When the desired orientation is reached, the user again clicks the mouse or user input device to release the pointer from the axis. It would be readily apparent to one of skill in the relevant art how to implement such a change in orientation. It is to be understood, however, that the present invention is not limited to changing the orientation in this manner. For example, the user could select from a number of pre-set rotations (e.g., rotate 90° to the left or right; rotate 45° to the left or right, etc.) by activating a drop-down menu, or by scrolling through the rotations by repeatedly clicking a mouse.

In a step 1004, UIM 210 sends a request to rotate while fixed in space to GPM 220 to draw the rotated probe. In a step 1006, GPM 220 requests data for the rotated probe from VSM 230. In a manner similar to that described above, the data that is extracted from 3D or data volume 240 by VSM 230 will depend upon the opacity selected by the user for the probe being rotated. If the opacity settings selected by the user are such that all datavalues for the probe being rotated are opaque, then the data extracted by VSM 230 will be limited to the surfaces of the probe being rotated. Alternatively, if the opacity settings selected by the user for the probe being rotated are such that some of the datavalues are opaque and some of the datavalues are transparent, then the data extracted by VSM 230 will include the data corresponding to the entire volume of the probe being rotated. In this manner, the probe can be drawn with its new orientation more quickly by minimizing the quantity of data that must be processed.

In step 1008, GPM 220 processes the data extracted by VSM 230 for the probe being rotated, and draws the probe with its new orientation in accordance with the attributes selected by the user, either by texture mapping onto the surfaces of the probe being rotated, or by volume rendering the entire volume of the probe being rotated.

As the user rotates the probe while it is fixed in space, steps 1002 through 1008 are repeated at a rate sufficiently fast that the user perceives the image of the probe, with texture mapping or volume rendering as appropriate, changing in "real-time" with the changing orientation of the probe. The image is being re-drawn at a frame rate sufficiently fast to be perceived as real-time by the user.

Figure 11:
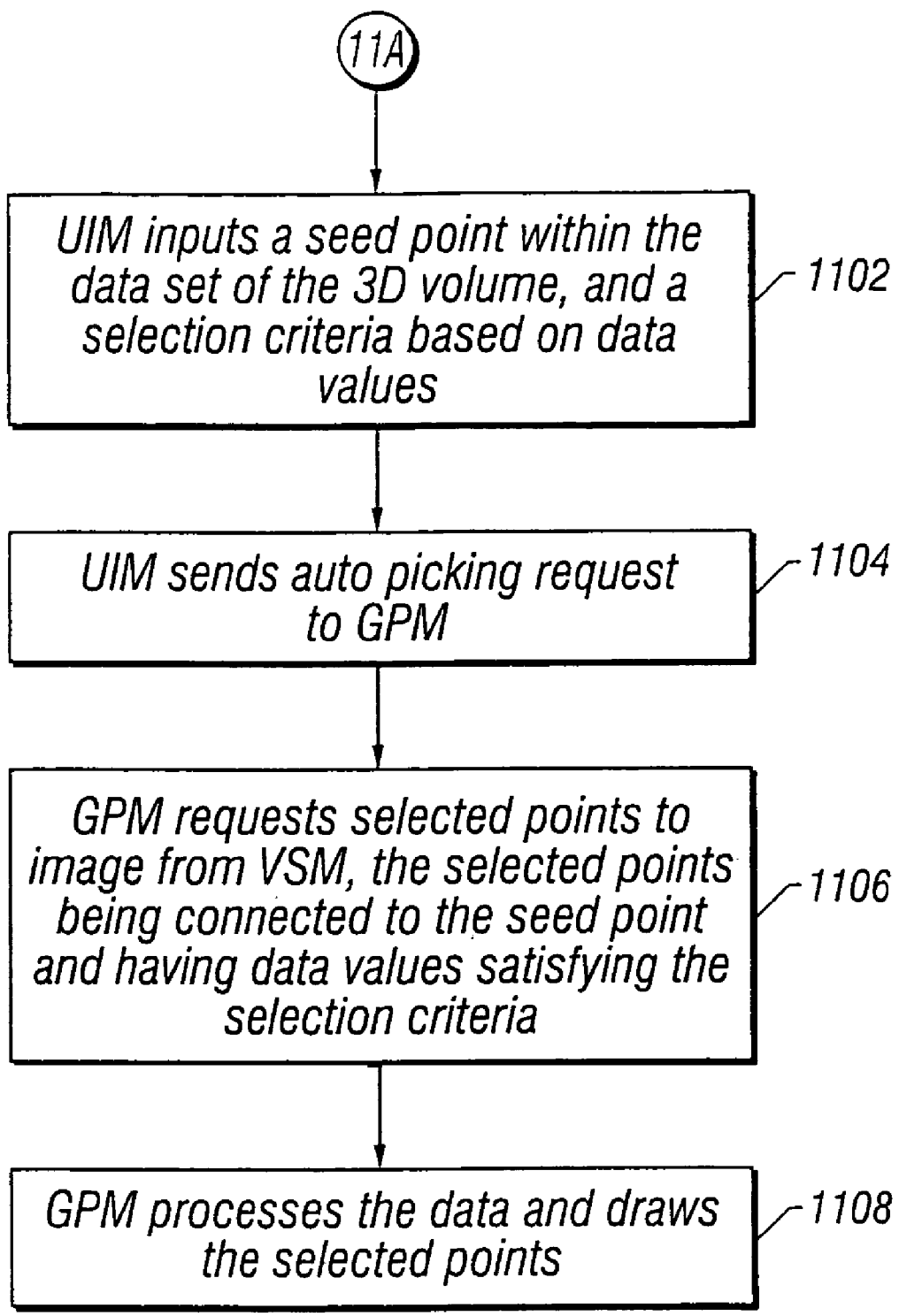
FIG. 11 shows a flow diagram of one embodiment for carrying out auto picking or seed selection.

If a user wants to carry out an "auto picking" process, then function 470 is carried out. The steps for carrying out function 470 are shown in FIG. 11 by way of flow diagram connector 11A. In a step 1102, a seed point within the data set of the 3D volume, and a selection criteria based on datavalues, are input by UIM 210 from the user. Preferably the seed point is within the data set of voxels that defines a probe. As described below, such a probe is referred to herein as a seed 3D sampling probe or an eraser 3D sampling probe. However, the seed point can be within the data set of voxels that defines the 3D volume, outside of an active probe. In a preferred embodiment of the present invention, the user selects the option to execute an auto picking process, for example, from a "drop-down" menu. The user then selects the seed point by clicking a mouse or other type of suitable user input device to snap a pointer onto the desired seed point. The selection criteria can be input, for example, by graphically selecting a range, or by keying in specific numerical values. It would be readily apparent to one of skill in the relevant art how to input from the user a seed point and filter range of datavalues.

In a step 1104, UIM 210 sends an auto picking request to GPM 220 to draw the rotated probe. In a step 1106, GPM 220 requests selected points to image from VSM 230. The selected points are those that are connected to the seed point, and that have a datavalue within the selection criteria.

In step 1108, GPM 220 processes the data extracted by VSM 230 to draw the selected points. The selected points are preferably highlighted by being drawn in a color different from those used to depict the features or physical parameters of the 3D volume data set. Alternatively, step 1108 can be carried out to "erase" or delete from the image the selected points.

In a similar manner, auto picking function 470 can be used to "erase" or de-select points. For example, an eraser 3D sampling probe is defined, such as by invoking function 420 to create an additional probe. A "de-selection" criteria based on datavalues is defined. Points previously selected by an auto picking operation that satisfy the de-selection criteria are identified as candidates for de-selection. As the eraser 3D sampling probe moves through the 3D volume, the de-selected points are deleted from the image, and the image is re-drawn sufficiently fast to be perceived as real-time by the user.

Once auto picking function 470 is initiated by the user, it can be carried out simultaneously with, for example, move function 430. In this manner, as the user moves the probe, steps 1102 through 1108 (and steps 702 through 708) are repeated at a rate sufficiently fast that the user perceives the image of the probe, with the selected points, changing in "real-time" with the changing location of the probe. As the probe is moved, the selected points can be highlighted by being drawn in a suitable color, thereby having the auto-picking 3D sampling probe function as a "highlighter" as it moves through the 3D volume. Alternatively, as the probe is moved, points previously selected by an auto picking operation can be "erased" or deleted from the image, thereby having the probe function as an "eraser" or eraser 3D sampling probe as it moves through the 3D volume. In either embodiment, the image is being re-drawn at a frame rate sufficiently fast to be perceived as real-time by the user.

If a user wants to create a "ribbon section," then function 480 is performed. The steps necessary for performing function 480 are described further below in reference to FIG. 17 and by way of block diagram connector 18A in FIG. 18.

If a user wants to create a "3D surface" representative of a physical phenomena found within a 3D volume data set, then function 490 is performed. The steps necessary for performing function 490 are described further below in reference to FIG. 19 and by way of block diagram connector 20A in FIG. 20.

In any event where a user desires to carry out one or more of the functions described above such as more probe (430), re-shape probe (440), create a ribbon section (480) and create a 3D surface (490), each function can be performed independent of, or in connection with, one or more of the other functions.

Figure 12:
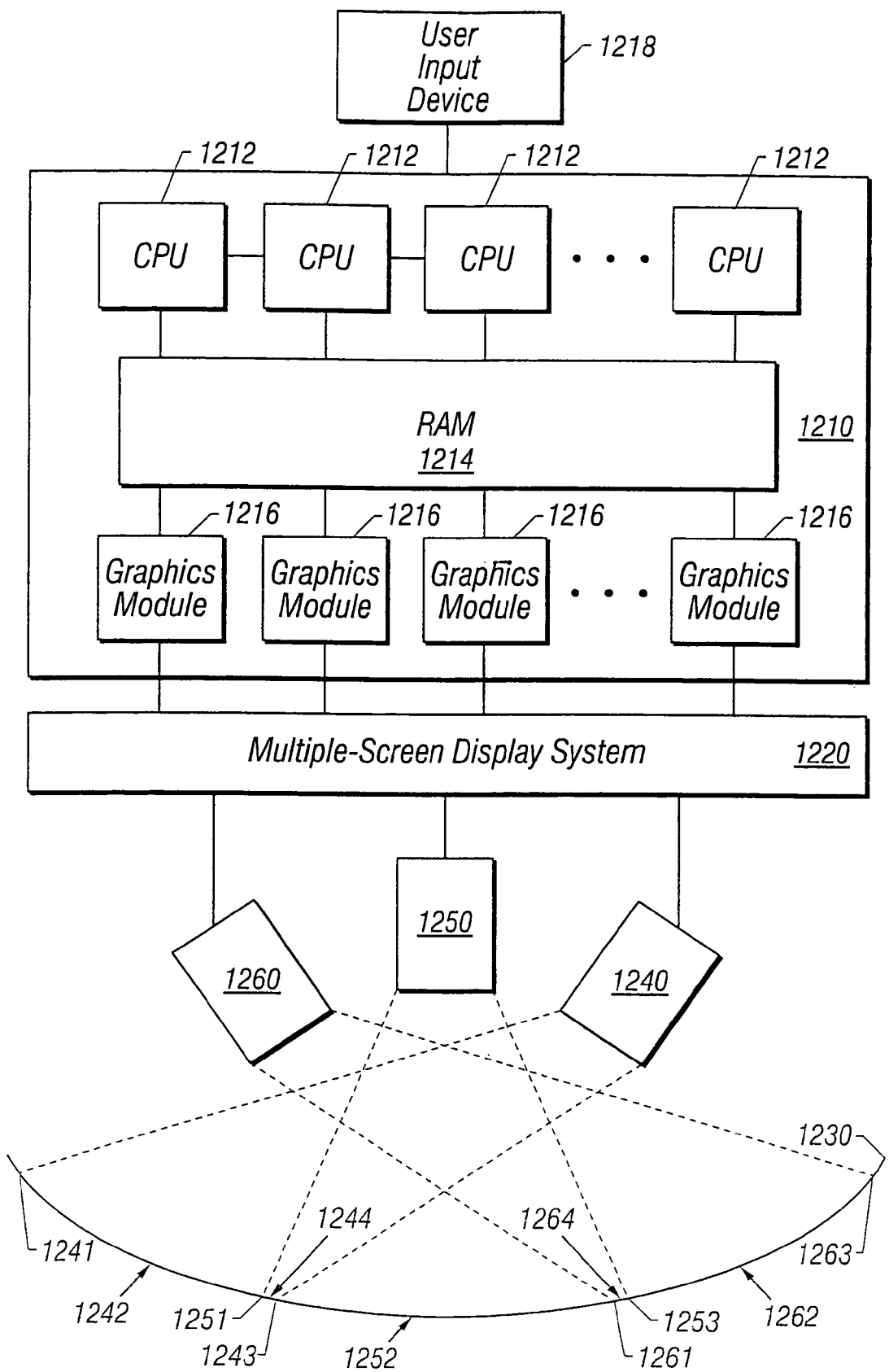
FIG. 12 shows one embodiment of a computer system suitable for use with the present invention.

With reference now to FIG. 12, one embodiment of a computer system suitable for use with the present invention is shown. A graphics supercomputer 1210 contains one or more central processing units (CPU) or processors 1212. Supercomputer 1210 contains a random access memory (RAM) 1214 that can be accessed by processors 1212. Supercomputer 1210 also contains one or more graphics modules 1216 that also access RAM 1214. Graphics modules 1216 execute the functions carried out by Graphics Processing Module 220, using hardware (such as specialized graphics processors) or a combination of hardware and software. A user input device 1218 allows a user to control and input information to graphics supercomputer 1210.

A particularly preferred graphics supercomputer is an Onyx2 Infinite Reality system, available from Silicon Graphics, Inc., Mountain View, Calif., configured with eight processors, three graphics pipelines, 16 GB of main memory, and 250 GB of disk memory. Such a graphics supercomputer has a scalable, high-bandwidth, low-latency architecture to provide high speed rendering on multiple graphics pipelines. Graphics supercomputers from other vendors, such as Hewlett-Packard Company of Palo Alto, Calif. or Sun Microsystems of Mountain View, Calif. could also be used.

The graphics data forming the image to be displayed is sent from graphics supercomputer 1210 to a multiple-screen display system 1220 for projection onto a screen 1230. In the embodiment shown in FIG. 12, three projectors are used. From the perspective of a user viewing the image on screen 1230, the three projectors include a left projector 1240, a center projector 1250, and a right projector 1260. Although three projectors are shown, the present invention is not limited to the use of any particular number of projectors.

Projector 1240 has a projection field on screen 1230, shown generally at 1242, between a point 1241 and a point 1243. Projector 1250 has a projection field on screen 1230, shown generally at 1252, between a point 1251 and a point 1253. Projector 1260 has a projection field on screen 1230, shown generally at 1262, between a point 1261 and a point 1263. Projection fields 1242 and 1252 have an overlap region 1244, between points 1251 and 1243. Similarly, projection fields 1262 and 1252 have an overlap region 1264, between points 1261 and 1253. The image to be displayed is divided into three (left, center, and right) over-lapping sub-images. By simultaneously projecting the three over-lapping sub-images, the field-of-view to the user is increased over that available, for example, on a monitor or through the use of just one projector. As an example, use of the three over-lapping sub-images shown in FIG. 12 increases the field-of-view to approximately 160°. Overlap regions 1244 and 1264 are each approximately 5.3°. Multiple-screen display system 1220 accounts for overlap regions 1244 and 1264 in a well-known manner to edge-blend the images of the three projectors to form one seamless image on screen 1230. Suitable display and projector systems are available from SEOS, London, England, such as the Barco projector units.

Figure 13:
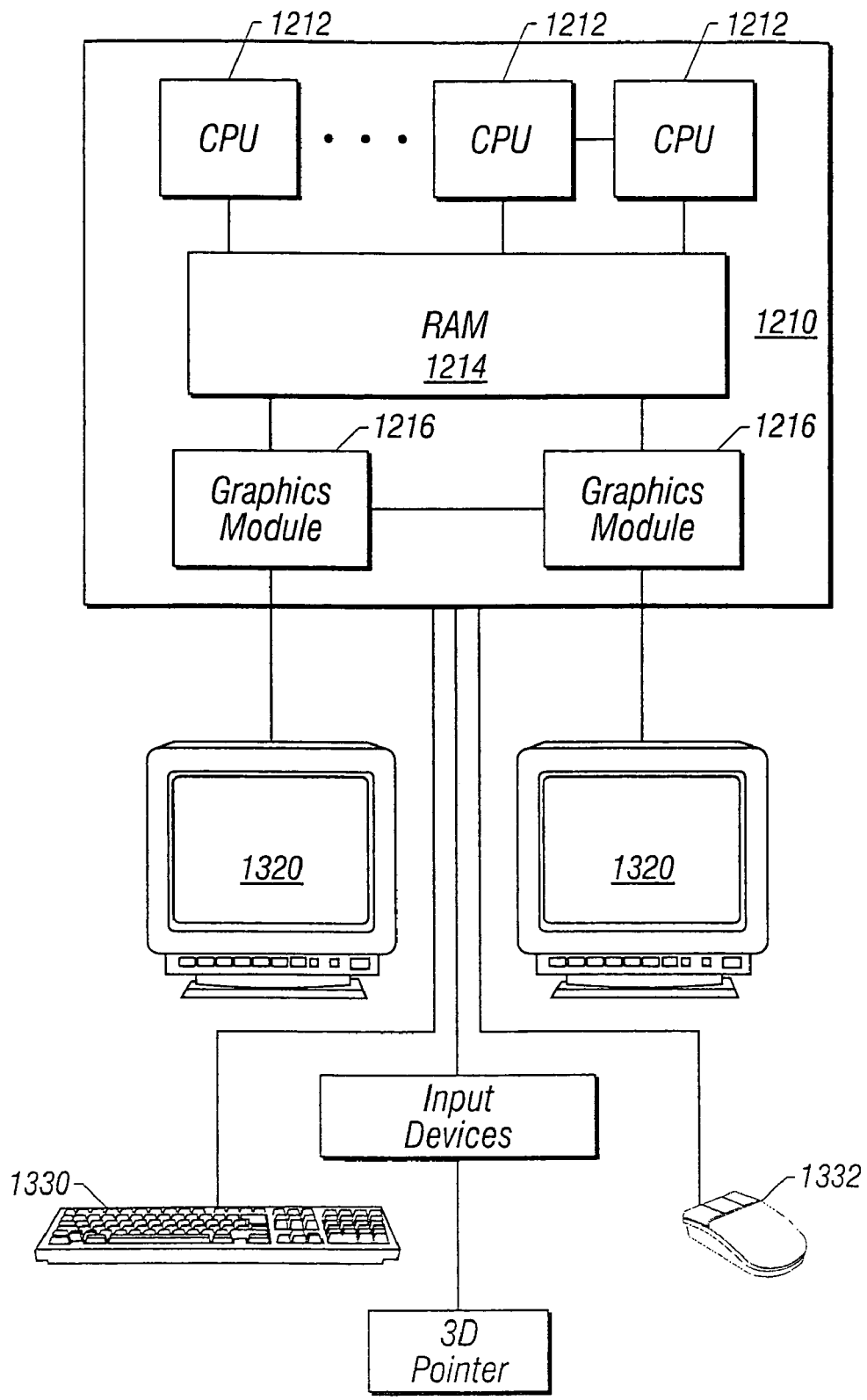
FIG. 13 shows an alternate embodiment of a computer system suitable for use with the present invention.

FIG. 13 shows an alternate embodiment of a computer system suitable for use with the present invention. In the embodiment shown in FIG. 13, graphics supercomputer 1210 is configured with multiple processors 1212, RAM 1214, and two graphics modules 1216. Graphics workstations suitable for use in the embodiment shown in FIG. 13 are available from Silicon Graphics, Inc. or Sun Microsystems. Each graphics module 1216 is connected to a monitor 1320 for display. Monitor 1320 should preferably be a color graphics monitor suitable for display of graphics such as that shown in FIGS. 15 and 16. Preferably, one of monitors 1320 displays the image of the 3D sampling probes, and the other of monitors 1320 displays the various menus used to operate 3D sampling probe program 110. FIG. 13 also shows a keyboard 1330 and a mouse 1332 that function as user input devices.

Figure 14:
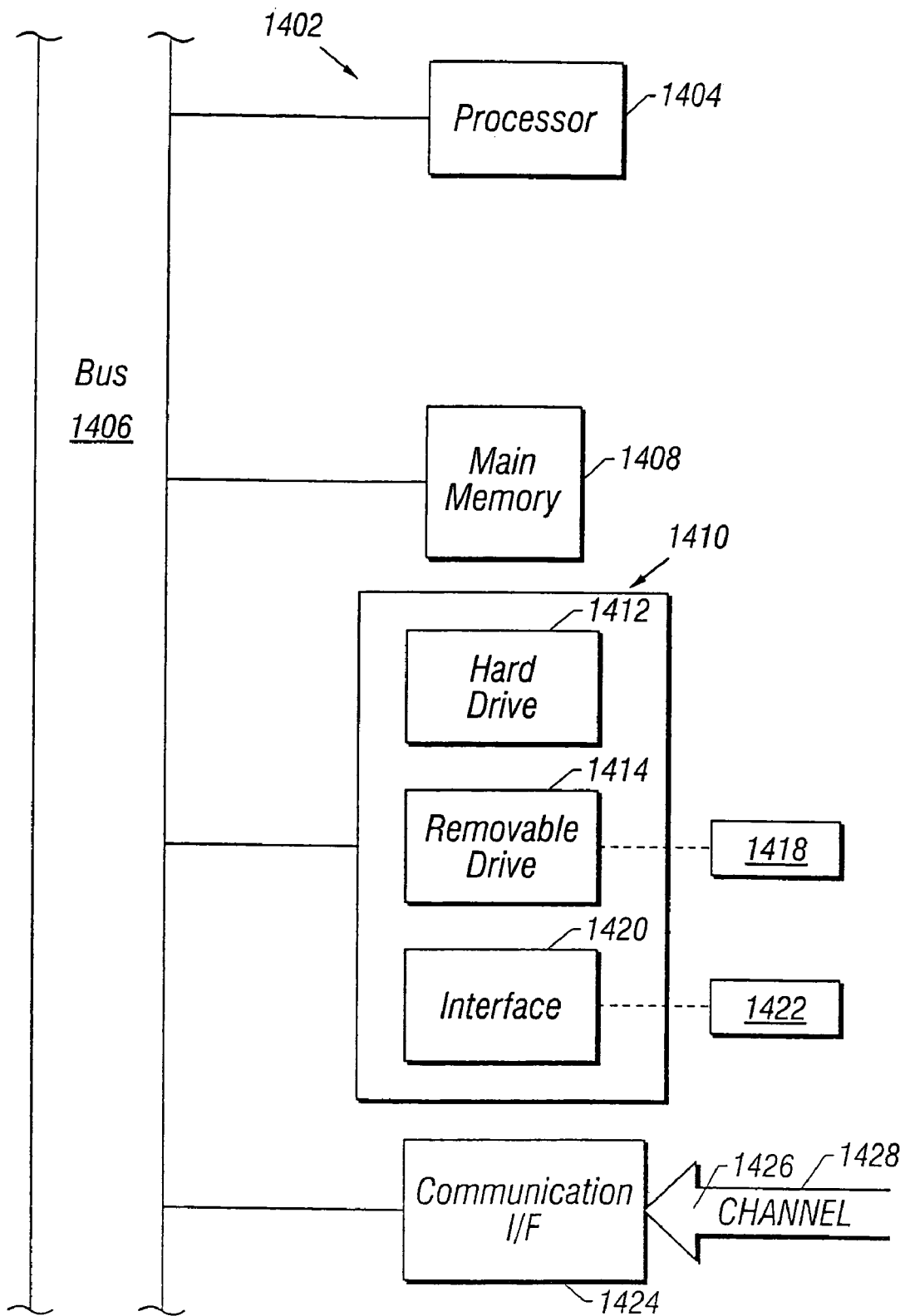
FIG. 14 shows further detail of an exemplary computer system suitable for use with the present invention.

A computer system capable of carrying out the functionality described herein is shown in more detail in FIG. 14. Computer system 1402 includes one or more processors, such as processor 1404. Processor 1404 is connected to a communication bus 1406. Various software embodiments are described in terms of this exemplary computer system. After reading this description, it will become apparent to a person skilled in the relevant art how to implement the invention using other computer systems and/or computer architectures.

Computer system 1402 also includes a main memory 1408, preferably random access memory (RAM), and can also include a secondary memory 1410. Secondary memory 1410 can include, for example, a hard disk drive 1412 and/or a removable storage drive 1414, representing a floppy disk drive, a magnetic tape drive, an optical disk drive, etc. Removable storage drive 1414 reads from and/or writes to a removable storage unit 1418 in a well known manner. Removable storage unit 1418, represents a floppy disk, magnetic tape, optical disk, etc. which is read by and written to by removable storage drive 1414. As will be appreciated, removable storage unit 1418 includes a computer usable storage medium having stored therein computer software and/or data.

In alternative embodiments, secondary memory 1410 may include other similar means for allowing computer programs or other instructions to be loaded into computer system 1402. Such means can include, for example, a removable storage unit 1422 and an interface 1420. Examples of such can include a program cartridge and cartridge interface (such as that found in video game devices), a removable memory chip (such as an EPROM, or PROM) and associated socket, and other removable storage units 1422 and interfaces 1420 which allow software and data to be transferred from removable storage unit 1422 to computer system 1402.

Computer system 1402 can also include a communications interface 1424. Communications interface 1424 allows software and data to be transferred between computer system 1402 and external devices. Examples of communications interface 1424 can include a modem, a network interface (such as an Ethernet card), a communications port, a PCM-CIA slot and card, etc. Software and data transferred via communications interface 1424 are in the form of signals 1426 that can be electronic, electromagnetic, optical or other signals capable of being received by communications interface 1424. Signals 1426 are provided to communications interface via a channel 1428. Channel 1428 carries signals 1426 and can be implemented using wire or cable, fiber optics, a phone line, a cellular phone link, an RF link and other communications channels.

In this document, the terms "computer program medium" and "computer usable medium" are used to generally refer to media such as removable program storage device 1418, and a hard disk installed in hard disk drive 1412. These computer program products are means for providing software to computer system 1402.

Computer programs (also called computer control logic) are stored in main memory 1408 and/or secondary memory 1410. Computer programs can also be received via communications interface 1424. Such computer programs, when executed, enable computer system 1402 to perform the features of the present invention as discussed herein. In particular, the computer programs, when executed, enable processor 1404 to perform the features of the present invention. Accordingly, such computer programs represent controllers of computer system 1402.

In an embodiment where the invention is implemented using software, the software may be stored in a computer program product and loaded into computer system 1402 using removable storage drive 1414, hard drive 1412 or communications interface 1424. The control logic (software), when executed by processor 1404, causes processor 1404 to perform the functions of the invention as described herein.

In another embodiment, the invention is implemented primarily in hardware using, for example, hardware components such as application specific integrated circuits (ASICs). Implementation of such a hardware state machine so as to perform the functions described herein will be apparent to persons skilled in the relevant art(s).

In yet another embodiment, the invention is implemented using a combination of both hardware and software.

System Operation and Results

The operation and results of the present invention will now be described, using a data volume 240 that contains seismic data (datavalues representing seismic amplitudes). The user specifies the particular seismic data volume to be used, which is loaded from disk into main memory. A default 3D sampling probe is drawn. The user specifies the colors to be used for the seismic amplitudes. The degree of transparency can also be selected. The three probes shown in FIG. 15 are all opaque, with the intersection of the probes and the seismic data volume texture mapped onto the surfaces of the probes. One of the probes is displayed with the bounding geometry shown; the other two probes are displayed without the bounding geometry.

FIG. 15 shows three active probes. The user has selected not to display the data contained in the background planes and in the remainder of the seismic data volume outside of the active probes. Two of the probes shown in FIG. 15 intersect each other, and the intersection of the two probes is displayed. In this manner, the user can more readily visualize and interpret geologic features inherent in the seismic data volume. For example, a geologic feature, represented by a dark band between two light bands, extends across the face of the larger intersecting probe and "turns the corner" to extend onto the face of the smaller intersecting probe perpendicular to it. The ability to move and intersect the probes with each other, and throughout the seismic data volume, enables a user to better interpret and track the extent of such a geologic feature.

FIG. 16 illustrates how one probe can be used to "cut" another probe to create a "hole" in a probe. As with FIG. 15, the user has selected not to display the data contained in the background planes and in the remainder of the seismic data volume outside of the active probes. FIG. 16 illustrates that the opacity settings can be individually selected by the user for each active probe. One of the probes shown in FIG. 16 is opaque, so that it is not possible to see through the surfaces of this probe. In order to see internal to this outer probe, it must be cut away by another probe. The outer opaque probe is referred to as a "data probe". A second completely transparent "cut probe" has been used to cut out a 3D sub-section of the data probe. Because the cut probe is completely transparent, it is not visible in FIG. 16. However, the fact that the completely transparent cut probe is present is evidenced by the fact that the opaque internal surfaces of the data probe are visible. The image of the intersection of the data probe and the cut probe is the intersecting surface internal to the data probe.

A third active probe is shown in FIG. 16. The third probe is displayed with the bounding geometry shown. The third probe is volume rendered with varying degrees of transparency so that the user can see through the outer surfaces of the probe and view geologic features within the third probe. As shown in FIG. 16, the third probe is volume rendered partially within the 3D sub-section of the data probe that has been cut away by the cut probe.

The third volume-rendered probe shown in FIG. 16 also contains selected points that have been selected through a seed picking process (function 470). The selected points have been imaged in a manner to highlight them for the user. The selected points are shown in FIG. 16 as connecting points. The seed point is illustrated in FIG. 16 by the darker sphere.

Figure 17:
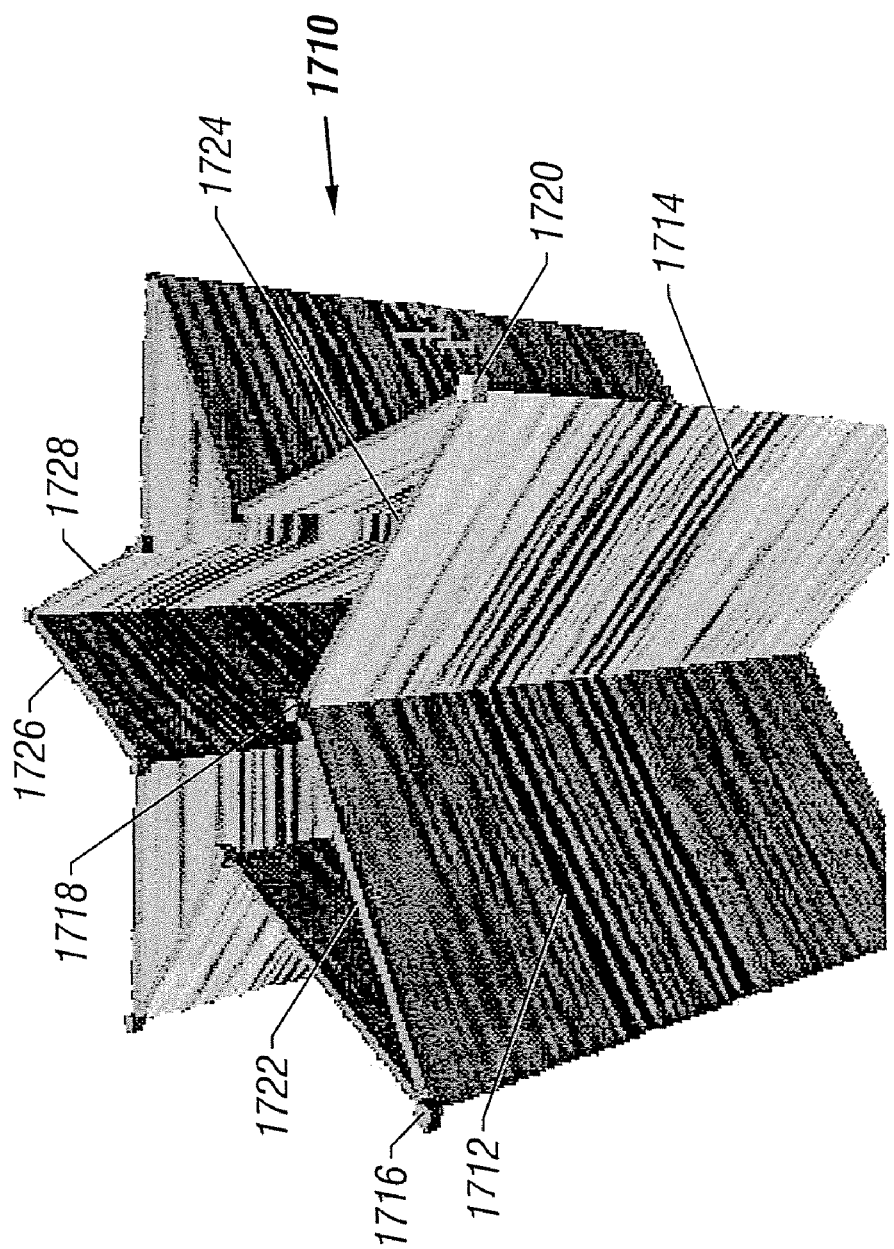
FIG. 17 illustrates a ribbon section according to the present invention in the shape of a star.

FIG. 17 illustrates one embodiment of a ribbon section 1710 in accord with the present invention. Like the probe, ribbon sections are a 3-D volume visualization method for displaying data along user-defined traverses through a 3-D volume data set within a probe. The traverses cut through the 3-D volume data set somewhat like a cookie cutter through dough and therefore are referred to herein as cookie planes such as cookie planes 1712 and 1714. Ribbon sections may display the 3-D data in orientations that do not necessarily conform to the orientation of the ordinate axis of the 3-D volume data set and/or probe. Ribbon section 1710 is produced by the user in accord with the process described herein below. The traverses or cookie planes are defined by digitizing control points such as control points 1716, 1718, and 1720, which may be selected from a face of the probe referred to as the "probe face plane." The user may create a transparent cut probe as described above to interface with an opaque ribbon section. Alternatively, the probe can be made opaque and the ribbon section can be made transparent if desired.

The control points may be used to produce a plurality of line segments such as line segments 1722, 1724, and 1726, which collectively are referred to as polyline 1728 which is like a polygon but may or may not be closed. Therefore, the line segments may form an open or closed line so that a single or multiple cookie planes may be produced. In a preferred embodiment, the area of data display, i.e. the cookie planes, is projected along a direction perpendicular to the probe face plane and the data displayed may extend to an opposing face of the probe referred to as the "opposing probe face plane." After creating a ribbon section, the user may use the mouse controls or keyboard to select, move, drag, or grab the control points to edit the ribbon section 1710 in real time and display different data from the 3D volume data set along the cookie planes 1712 and 1714. In addition to editing the ribbon section 1710 to view different data from the 3D volume data set within the probe, the entire ribbon section 1710 and probe may be simultaneously moved to a different position in order to view different data from the 3D volume data set outside the boundaries of the probe at its prior position. Active control point 1720 is preferably high-lighted or colored differently as compared to the other control points to indicate control point 1720 is in an active state for operations such as moving, deleting, or otherwise editing as discussed further below. Control points may be inserted or deleted after the initial ribbon section construction. The ribbon section geometry and orientation may also be saved for future work sessions.

Figure 18:
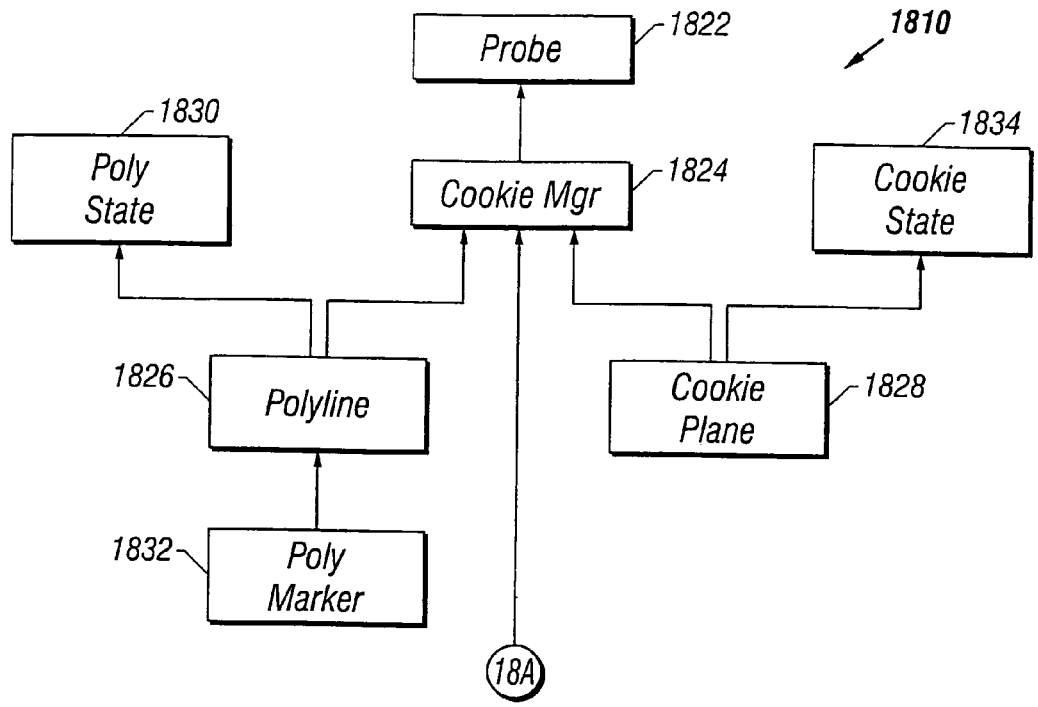
FIG. 18 shows a block diagram of a system for producing the ribbon section of FIG. 17.

FIG. 18 depicts a block diagram of system 1810 for program modules in a presently preferred embodiment of the invention for producing ribbon sections at real time frame rates as discussed herein above. Probe module 1822 provides initial context for sketching polyline 1728. Probe module 1822 supplies user activity data such as mouse clicks or keystrokes to cookie manager 1824. Thus, user activity data such as creation of control points, deletion of control points, moving of control points, moving of the entire probe, and the like are inserted into system 1810.

Cookie manager 1824 manages the user input data supplied by probe 1822. Cookie manager 1824 distributes the data, e.g. control points add, move, and delete as appropriate to both polyline module 1826 and cookie plane module 1828. For some types of data, such as inserting a control point, cookie manager 1824 receives data from polyline module 1826 and passes the data to cookie plane module 1828.

Polyline module 1826 manages data related to polyline 1728 and the associated control points in conjunction with polymarker module 1832 and polystate module 1830. Polyline 1728 is mainly provided for visual reference. Polyline module 1826 in conjunction with polystate module 1830 manages the state of the control points. For instance, in the active state, a control point can be moved or deleted. The active control point, such as active control point 1720 is preferably highlighted. The control points may be enlarged or decreased in size for easier viewing. Polymarker module 1832 provides visual context such as highlighting or varied colors, for the control points so that an operator knows which point is in the active state for moving, deleting, and otherwise editing. Polymarker module 1832 also may provide text such as the location indication adjacent active control point 1720.

Cookie plane module 1828 provides textured geometry, which may for instance be lithography-related for geological data, to the surface of the cookie planes such as cookie planes 1712 and 1714. Cookie state module 1834 monitors the state of the cookie planes so that in the active state one or more cookie planes can be moved or otherwise edited whereas in the inactive state no changes are made.

During operation of system 1810, probe module 1822 may notify cookie manager 1824 that an event has taken place, e.g., a marker deletion, i.e., a control point deletion. Cookie manager 1824 then notifies polyline module 1826 which deletes the marker or control point and joins up the two surrounding lines into one line and notifies the polymarker module to remove the deleted marker from the list of polymarkers maintained by polymarker module 1832. Cookie manager 1824 and cookie plane module then convert the two planes into one.

Figure 19:
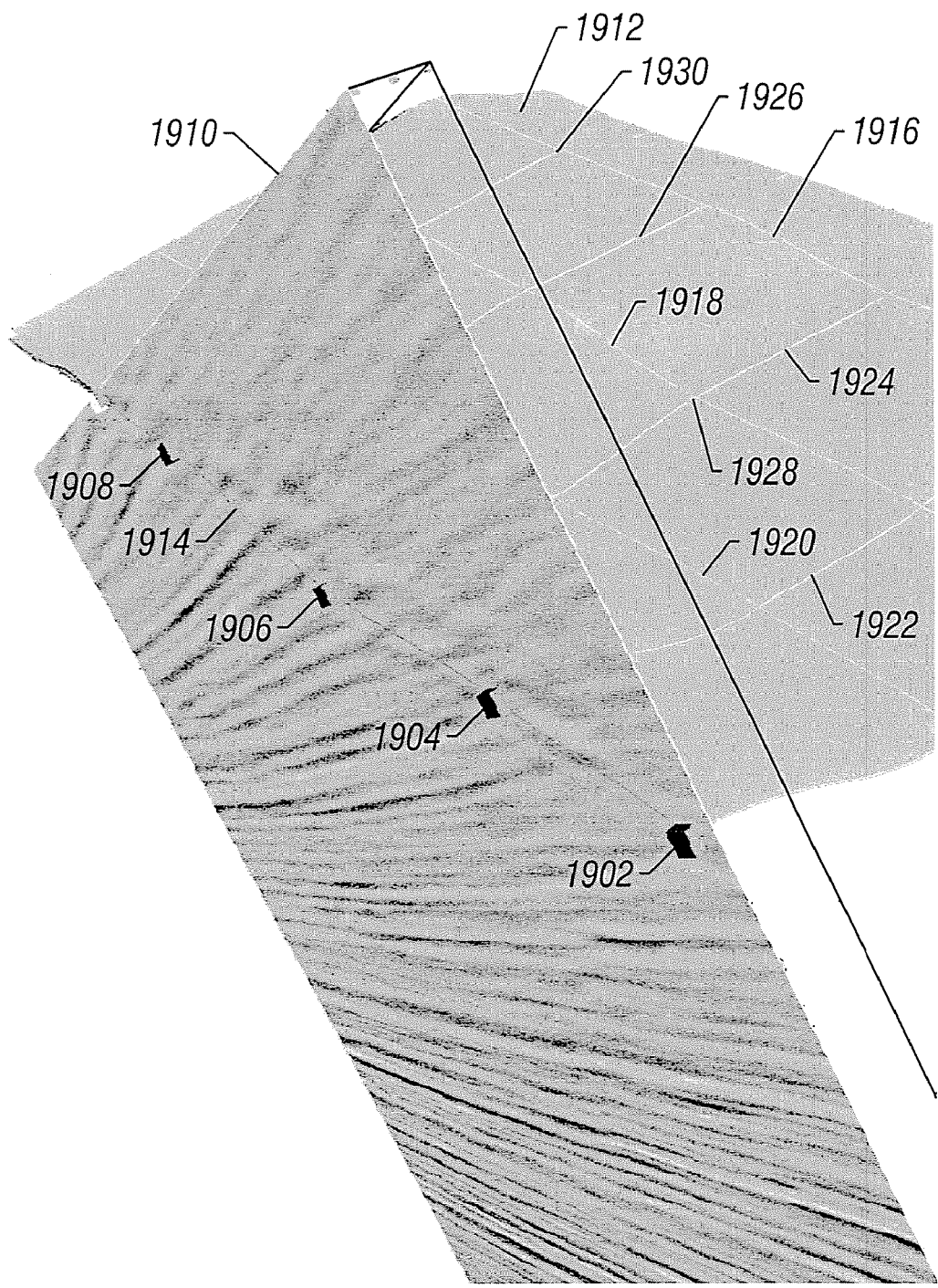
FIG. 19 illustrates a three dimensional grid and three dimensional surface representative of a physical phenomena described by a 3-D volume data set according to the present invention.

FIG. 19 illustrates one embodiment of the invention for creating a three dimensional surface representative of a physical phenomena described by a 3D volume data set such as, for example, a geological fault surface. In fact, this method has been found to easily and quickly provide 3D volume visualization for rapid identification and interpretation of geological fault surfaces. However, other types of surfaces for other types of data could also be quickly described from use of the method of the present invention. Although the method is described in more detail below, in general the method is used to digitize control points, such as control points 1902, 1904, 1906, and 1908 along a probe face 1910. Visual examination of the textured surface of probe face 1910 permits an operator to visually locate control points on a structure of interest such as a suspected fault line. Probe face 1910 is then moved, and a new set of control points are digitized. Surface 1912 is then interpolated between the initial points and the new control points. The control points may be easily edited or moved to more accurately define the surface may be 1912 at a real time frame rate as discussed above. This process can be repeated until the surface interpretation is complete, at which time the surface 1912 can be saved.

Thus, one embodiment of the invention disclosed by FIG. 19 provides a method of rapidly constructing a three-dimensional surface or fault found within a 3-D volume data set. In a preferred embodiment, 3-D probes, as discussed above, are used. The method involves constructing a plurality of spline curves, such as spline curve 1914 on the probe face 1910 which may be interactively constructed when visualizing the data displayed on probe face 1910. Spline curve 1914 is interpolated using an algorithm created in the same way as spline curves 1916, 1918, and 1920 are interpolated. Spline curves and v-curves 1922, 1924, and 1926, are produced to form a grid. The grid outlines the three dimensional surface 1912.

For construction of the initial spline curve, such as for instance spline curve 1914, the user digitizes control points, such as control points 1902, 1904, 1906 and 1908 on the probe face 1910. Markers are produced at these control points and spline curve 1914 is interpolated between the control points 1902, 1904, 1906 and 1908. Control points 1902, 1904, 1906 and 1908 may be moved within probe face 1910, thereby interpolating a new spline curve 1914. Once the probe face 1910 is selected, the other probe surfaces are made transparent for ease of operation. Additionally, the selected probe face 1910 may be made opaque in order to view surface 1912 through the probe face 1910.

The user then moves the probe face to 1910 to another position and selects new control points. The user may easily move back and forth between previously created spline curves by selecting grid intersections such as intersection 1928 or 1930. As additional spline curves are created, the v-curves may also be smoothly and quickly interpolated using another algorithm. The user preferably creates a plurality of spline curves in the same manner, and interpolation of surface 1912 is immediately displayed at real time frame rates as discussed here above.

The user may stop the probe and move one or more control points, such as control points 1902, 1904, 1906 and 1908 to adjust the position of the respective spline curve such as spline curve 1914. All other spline curve, such as spline curves 1916, 1918, and 1920 remain the same while surface 1912 is smoothly interpolated between the current spline curve 1914 on the probe face 1910 and the prior spline curve 1920. The remainder of the surface 1912 remains the same unless the user moves the prove face 1910 to another spline curve such as 1920 and proceeds to edit the same thereby reshaping the surface 1912 between the current spline curve 1920 on the probe face place 1910 and the prior spline curve 1918.

Additional spline curves may be added between existing spline curves if desired. By selecting grid intersections such as grid intersections 1928 or 1930, or by selecting control points on the probe face, such as control points 1902, 1904, 1906 and 1908, the user may quickly move the probe face 1910 back and forth as desired. Once a grid intersection is selected, the user may move the respective control points within the probe face 1910 that will be displayed as indicated in FIG. 19, and surface 1912 with its spline curves and v-curves will follow interactively. The spline curves and the v-curves may or may not be displayed depending on preference of the user. Preferably, only one probe face 1910 is displayed at a time for clarity.

Figure 20:
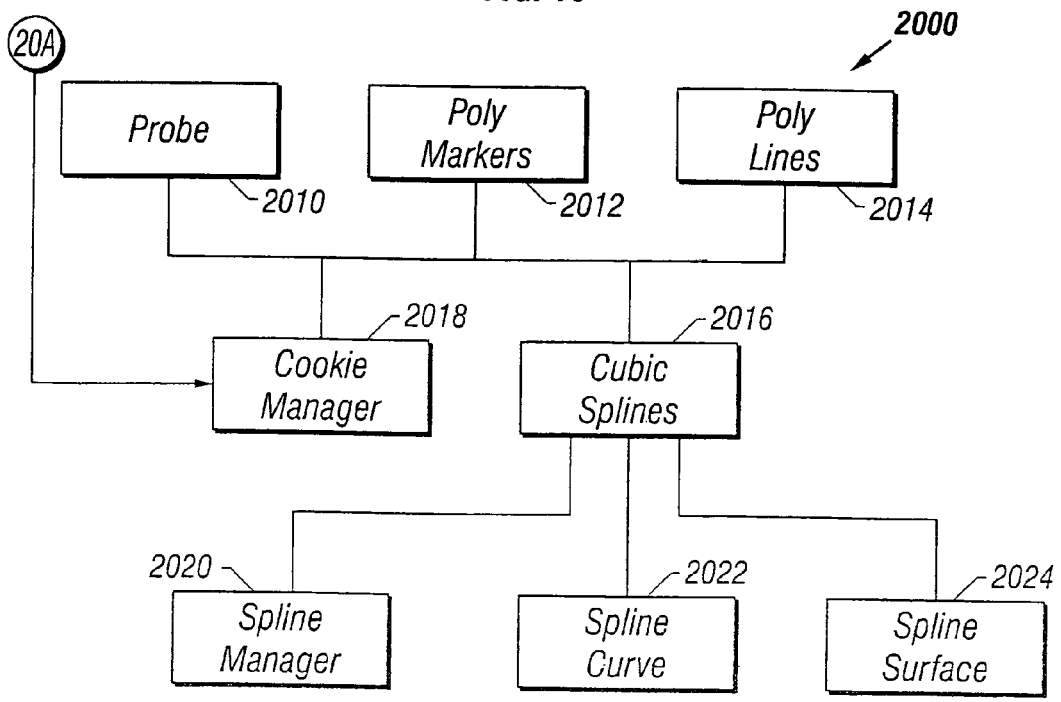
FIG. 20 shows a block diagram of a system for producing the grid and surface of FIG. 19.

FIG. 20 discloses modular system 2000 which describes the software for performing the functions as described in connection with FIG. 19. In one embodiment, modular system 2000 incorporates many of the same modules as used in modular system 1810 for producing a ribbon section. Thus, the design may permit a more general control that may effectively perform both ribbon section functions as well as surface mapping functions. For instance, cookie module 2018, polymarker module 2012, and polyline module 2014 may be used in the manner discussed above relating to producing ribbon sections. Likewise, probe module 2010 therefore again performs the functions as previously noted such as providing initial sketching splines such as spline 1914, which will also be observed to be similar to the polylines discussed hereinbefore. Probe module 2010 supplies user activity data such as mouse clicks and keystrokes to the various other modules. Cubic spline module 2016 relates to controlling functions for the editable surface or mapping feature such as surface 1912 shown in FIG. 19. Cubic spline module 2016, spline manager module 2020, spline curve module 2022, and spline surface module 2024 are functions that are different from those used only in creating ribbon sections. Spline manager 2020 performs a number of different functions such as creating or deleting surfaces, changing mode functions from creating a surface to editing a surface, as well as read and write functions. For instance, spline manager 2020 may read and write to a surface attribute file regarding attributes such as colors, showing the grid, marker colors, and the like. Spline curve module 2022 keeps track of the spline curves, keeps track of which spline curve may be in the editing or creating state and keeps track of changes made to the spline curves. Spline surface module 2024 acts on the changes made for interpolating the resulting surface changes.

By using the system and method of the present invention, geologists and geophysicists can more quickly and accurately visualize and interpret 3D seismic data. This sharply reduces 3D seismic project cycle time, boosts production from existing fields, and finds more reserves.

CONCLUSION

While various embodiments of the present invention have been described above, it should be understood that they have been presented by way of example only, and not limitation. Thus, the breadth and scope of the present invention should not be limited by any of the above-described exemplary embodiments, and should be defined in accordance with the spirit of the invention including the following claims and their equivalents.

The invention claimed is:

1. A method for imaging a three-dimensional data volume, said three-dimensional data volume comprising a plurality of voxels, each voxel comprising a three-dimensional location and a dataword, said dataword being representative of a physical phenomena, said method comprising:
creating at least one three-dimensional sampling probe, wherein said three-dimensional sampling probe is the same size or a subset of said three-dimensional data volume, said three-dimensional sampling probe having a probe face plane in a probe face plane and an opposing probe face in an opposing probe face plane;
producing a plurality of control points in said probe face plane, said plurality of control points defining one or more lines on said probe face plane;
extending a ribbon section from said probe face plane toward said opposing probe face plane, one edge of said ribbon section being formed by said one or more lines; and
selectively imaging datawords representative of said physical phenomena only at three-dimensional locations where said ribbon section intersects said three-dimensional sampling probe.

2. The method of claim 1, further comprising:
editing said plurality of control points in said probe face plane to thereby redefine said one or more lines, and
extending another redefined ribbon section from said probe face plane toward said opposing probe face plane.

3. The method of claim 2, wherein said step of editing further comprises: deleting one or more of said plurality of control points.

4. The method of claim 2, wherein said step of editing further comprises: changing a location of one or more of said plurality of control points.

5. The method of claim 2, wherein said step of editing further comprises: adding one or more control points to said plurality of control points.

6. The method of claim 1, wherein said ribbon section is perpendicular to said probe face plane.

7. The method of claim 1, wherein said ribbon section extends from said probe face plane to said opposing probe face plane.

8. The method of claim 1, wherein said one or more lines comprise a plurality of straight lines.

9. The method of claim 1, wherein said one or more lines form a closed line.

10. The method of claim 1, wherein said ribbon section is comprised of a plurality of planes.

11. The method of claim 1, wherein said three-dimensional probe has a plurality of side faces perpendicular to said probe face plane, said ribbon section being nonparallel with respect to each of said plurality of side faces.

12. A computer program medium having computer executable instructions for imaging a three-dimensional data volume, said three-dimensional data volume comprising a plurality of voxels, each voxel comprising a three-dimensional location and a dataword, said dataword being representative of a physical phenomena, the instructions being executable to implement:
displaying a plane within said three-dimensional data volume;
producing a plurality of control points in said plane, said plurality of control points defining one or more lines on said plane;
extending a ribbon section from said plane, one edge of said ribbon section being formed by said one or more lines; and
selectively imaging said datawords representative of said physical phenomena only at three-dimensional locations where said ribbon section intersects said three-dimensional data volume.

13. The computer program medium of claim 12, further comprising instructions being executable to implement:
editing said plurality of control points in said plane to thereby redefine said one or more lines, and
extending another redefined ribbon section from said plane toward an opposing plane.

14. The computer program medium of claim 13, wherein said step of editing further comprises: deleting one or more of said plurality of control points.

15. The computer program medium of claim 13, wherein said step of editing further comprises: changing a location of one or more of said plurality of control points.

16. The computer program medium of claim 13, wherein said step of editing further comprises: adding one or more control points to said plurality of control points.

17. The computer program medium of claim 12, wherein said ribbon section is perpendicular to said plane.

18. The computer program medium of claim 12, wherein said ribbon section extends from said plane to an opposing plane.

19. The computer program medium of claim 12, wherein said one or more lines comprise a plurality of straight lines.

20. The computer program medium of claim 12, wherein said one or more lines form a closed line.

21. The computer program medium of claim 12, wherein said ribbon section is comprised of a plurality of planes.

22. The computer program medium of claim 12, wherein said plane is a probe face plane of a three-dimensional probe which has a plurality of side faces perpendicular to said probe face plane, said ribbon section being oriented so as not to be parallel to at least one of said plurality of side faces.

* * * * *

UNITED STATES PATENT AND TRADEMARK OFFICE
CERTIFICATE OF CORRECTION

PATENT NO. : 7,502,026 B2  Page 1 of 1
APPLICATION NO. : 11/485104
DATED : March 10, 2009
INVENTOR(S) : Mark Acosta et al.

It is certified that error appears in the above-identified patent and that said Letters Patent is hereby corrected as shown below:

Column 3, line 24: "Therefore" should read "therefore"

Column 3, line 26: "thee" should read "three"

Column 3, line 56: "thee" should read "three"

Column 3, line 67: "thee" should read "three"

Column 10, line 53: "will" should read "with"

Column 23, line 61: "surface may be 1912" should read "surface 1912"

Column 24, line 40: "curve" should read "curves"

Column 24, line 46: "prove" should read "probe"

Signed and Sealed this

Sixteenth Day of June, 2009

JOHN DOLL
*Acting Director of the United States Patent and Trademark Office*